United States Patent
Garnett et al.

[19]

[11] Patent Number: 6,138,198
[45] Date of Patent: Oct. 24, 2000

[54] PROCESSOR BRIDGE WITH DISSIMILAR DATA REGISTERS WHICH IS OPERABLE TO DISREGARD DATA DIFFERENCES FOR DISSIMILAR DATA WRITE ACCESSES

[75] Inventors: Paul J. Garnett, Newton-Le-Willows; Stephen Rowlinson, Reading; Femi A. Oyelakin, Hayes, all of United Kingdom; Emrys J. Williams, Sunnyvale, Calif.

[73] Assignee: Sun Microsystems, Inc., Palo Alto, Calif.

[21] Appl. No.: 09/097,467

[22] Filed: Jun. 15, 1998

[51] Int. Cl.[7] .................................................. G06F 13/40
[52] U.S. Cl. .................................................. 710/129
[58] Field of Search ................................. 710/105, 101, 710/126, 129

[56] References Cited

U.S. PATENT DOCUMENTS

| | | | |
|---|---|---|---|
| 5,301,283 | 4/1994 | Thacker et al. | 710/116 |
| 5,412,788 | 5/1995 | Andres | 709/224 |
| 5,517,648 | 5/1996 | Bertone et al. | 710/244 |
| 5,551,035 | 8/1996 | Arnold et al. | 709/303 |
| 5,586,253 | 12/1996 | Green et al. | |
| 5,615,403 | 3/1997 | Bissett et al. | |
| 5,627,965 | 5/1997 | Liddell et al. | |
| 5,692,204 | 11/1997 | Rawson et al. | 713/340 |
| 5,778,446 | 7/1998 | Kim | 711/167 |
| 5,809,340 | 9/1998 | Bertone et al. | 710/58 |
| 5,844,856 | 12/1998 | Taylor | 365/230.05 |

FOREIGN PATENT DOCUMENTS

97/43712 11/1997 WIPO .

OTHER PUBLICATIONS

Brumm et al., 80383 A Programming & Design Handbook, pp. 31–32.

International Search Report, Application No. PCT/US99/12430, mailed Sep. 27, 1999.

*Primary Examiner*—Glenn A. Auve
*Attorney, Agent, or Firm*—Conley, Rose & Tayon, PC; B. Noel Kivlin

[57] ABSTRACT

A bridge for a multi-processor system includes bus interfaces for connection to an I/O bus of a first processing set, an I/O bus of a second processing set and a device bus. A bridge control mechanism is configured to compare address and data phases of I/O accesses by the first and second processing sets. At least one dissimilar data register is provided for each processing set. The bridge control mechanism is operable in response to an address phase of a dissimilar data register write access to disregard any differences in the data phase for the dissimilar data write access. Non-deterministic data (for example relating to a real time clock) can be output from the processing sets in a combined (lockstep comparison) mode. A read destination address supplied in common by the first and second processing sets for a dissimilar data read access can cause data read from a determined one of the dissimilar data registers to be supplied the first and second processing sets. In this manner, the processing sets may have the dissimilar data replaced by the same data. The read destination address supplied in common by the first and second processing sets can determine the dissimilar data register from which data is read.

23 Claims, 23 Drawing Sheets

PROCESSOR BRIDGE WITH DISSIMILAR DATA REGISTERS WHICH IS OPERABLE TO DISREGARD DATA DIFFERENCES FOR DISSIMILAR DATA WRITE ACCESSES

BACKGROUND OF THE INVENTION

This invention relates to a multi-processor computer system including first and second processing sets (each of which may comprise one or more processors) which communicate with an I/O device bus.

The application finds particular application to fault tolerant computer systems where two or more processor sets need to communicate with an I/O device bus in lockstep with provision for identifying lockstep errors in order to identify faulty operation of the system as a whole.

It has been proposed to identify lockstep errors by comparing I/O operations output by the processing sets. This is a reliable method as long as the outputs from the processor sets are deterministic, that is as long as the outputs from the processing sets are going to be identical when the processors are operating correctly. This will normally be the case when the processors are operating synchronously under the control of a common clock. However, it can be that some events may not be wholly deterministic. An example of this is where the individual processing sets each include a real time clock which are not synchronized. If the real time clocks are sampled by the respective processing sets, then a different sample may be generated in the respective processing sets. For example, if the sample is taken at just the time at which the clocks are incremented, one processing set may take the sample just before the increment and the other may take the sample just after the increment.

Where these different values are output by the processing sets and are evaluated by a comparator check for lockstep operation, this would be determined as a lockstep error. A further problem is that such values may be operated on by the individual processing sets which could lead to further divergence of the processing sets.

These problems have had the effect of limiting the design of lockstep systems to avoid the danger of potentially non-deterministic events. Accordingly, an aim of the invention is to overcome or at least mitigate these problems.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a bridge for a multi-processor system. The bridge comprises bus interfaces for connection to an I/O bus of a first processing set, an I/O bus of a second processing set and a device bus. A bridge control mechanism is configured to compare address and data phases of I/O accesses by the first and second processing sets. At least one dissimilar data register is provided for each processing set. The bridge control mechanism is operable in response to an address phase of a dissimilar data register write access to disregard any differences in the data phase for the dissimilar data write access.

In an embodiment of the invention, therefore, non-deterministic data (for example relating to a real time clock) can be output from the processing sets in the combined (lockstep comparison) mode. In a subsequent phase, the processing sets can then read in common a selected one of the dissimilar data registers, whereby it is possible to transfer the dissimilar data from one processor to the other without causing a lockstep error to be detected. The bridge control mechanism can be operable to disregard the data and the associated data parity for the DMA access.

It should be noted that the bus interfaces referenced above need not be separate components of the bridge, but may be incorporated in other components of the bridge, and may indeed be simply connections for the lines of the buses concerned.

A comparator can be connected to the first and second processor bus interfaces and can be operable in the combined mode to detect differences between signals on the I/O buses of the first and second processing sets as indicative of a lockstep error. However, in an embodiment of the invention, an address detector is responsive to a signal identifying a write to a dissimilar data register during an address phase of an I/O access by the first and second processing sets to inhibit the comparator during the subsequent data phase of the I/O access. The output of the comparator may be blocked or the operation of the comparator may be inhibited.

A read destination address supplied in common by the first and second processing sets for a dissimilar data read access can cause data read from a determined one of the dissimilar data registers to be supplied to the first and second processing sets. In this manner, the processing sets may have the dissimilar data replaced by the same data. The read destination address supplied in common by the first and second processing sets can determine the dissimilar data register from which data is read.

In an embodiment of the invention, an address decode mechanism is connected to the first processor bus interface, the second processor bus interface and the device bus interface. The address decode mechanism is operable to determine source and destination addresses for write and read accesses and to respond to a common write destination address for a write to a dissimilar data register to modify the write destination address dependent upon the source of the address. The address decoder can thus derive first and second dissimilar data register addresses for the first and second processing sets, respectively, from a common write destination address supplied by the first and second processing sets.

A controllable routing matrix is connected between the first processor bus interface, the second processor bus interface, the device bus interface and the dissimilar data registers. The bridge control mechanism is operable to control the routing matrix selectively to interconnect the first processor bus interface, the second processor bus interface, the device bus interface and the dissimilar data registers.

The address decode mechanism is responsive to a read destination address supplied in common by the first and second processing sets for a dissimilar data read access to access one of the first and second dissimilar data registers from the common read destination address.

The common write destination address could different from the common read destination address. Alternatively, for example, it could be one of the possible read addresses.

Initiator and target controllers can be provided for determining a path from an input to an output of the routing matrix, the initiator controller being responsive to determination of the master for an bus operation and the target controller being responsive to determination of a destination address by the address decode mechanism.

The dissimilar data registers can be configured as a hardware registers in the bridge. Alternatively, the could be configured within random access memory in the bridge.

More than two processor bus interfaces may be provided for connection to an I/O bus of a further processing set.

In accordance with another aspect of the invention, there is provided a computer system comprising a first processing set having an I/O bus, a second processing set having an I/O bus, a device bus and a bridge as defined above. Each processing set may comprises at least one processor, memory and a processing set I/O bus controller.

In accordance with a further aspect of the invention, there is provided a method of operating a multi-processor system as set out above, the method comprising:

comparing address and data phases of I/O accesses by the first and second processing sets for determining lockstep operation of the processing sets;

detecting an address phase of a dissimilar data register write access; and disregarding differences in the data phase for the dissimilar data write access; and storing the data of the data phase for the dissimilar data write access for the first and second processing sets in first and second dissimilar data registers, respectively.

The method can comprises subsequently detecting a read destination address supplied in common by the first and second processing sets for a dissimilar data read access to supply data read from a determined one of the dissimilar data registers to the first and second processing sets.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
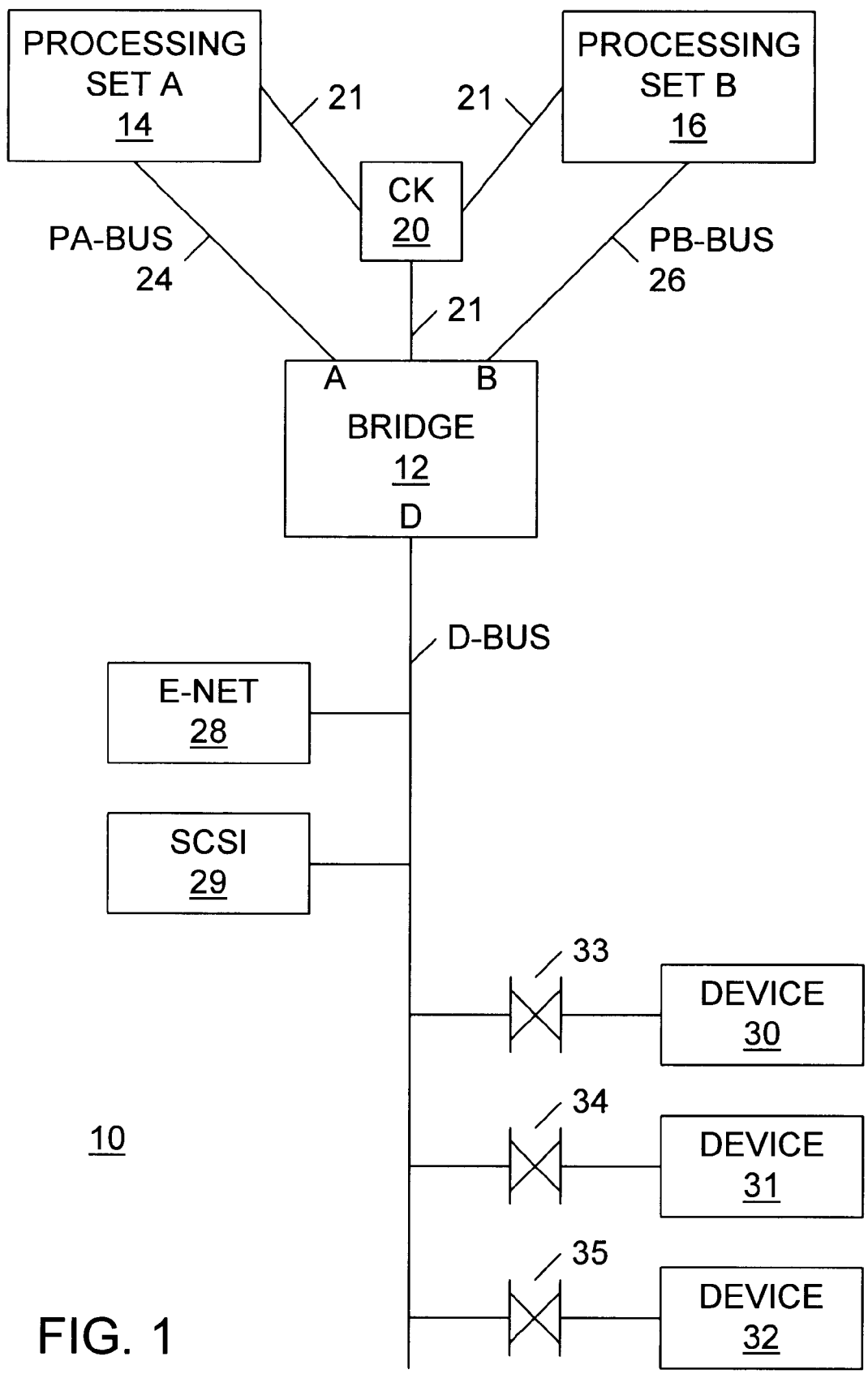
FIG. 1 is a schematic overview of a fault tolerant computer system incorporating an embodiment of the invention.

FIG. 1 is a schematic overview of a fault tolerant computing system 10 comprising a plurality of CPUsets (processing sets) 14 and 16 and a bridge 12. As shown in FIG. 1, there are two processing sets 14 and 16, although in other embodiments there may be three or more processing sets. The bridge 12 forms an interface between the processing sets and I/O devices such as devices 28, 29, 30, 31 and 32. In this document, the term "processing set" is used to denote a group of one or more processors, possibly including memory, which output and receive common outputs and inputs. It should be noted that the alternative term mentioned above, "CPUset", could be used instead, and that these terms could be used interchangeably throughout this document. Also, it should be noted that the term "bridge" is used to denote any device, apparatus or arrangement suitable for interconnecting two or more buses of the same or different types.

The first processing set 14 is connected to the bridge 12 via a first processing set I/O bus (PA bus) 24, in the present instance a Peripheral Component Interconnect (PCI) bus. The second processing set 16 is connected to the bridge 12 via a second processing set I/O bus (PB bus) 26 of the same type as the PA bus 24 (i.e. here a PCI bus). The I/O devices are connected to the bridge 12 via a device I/O bus (D bus) 22, in the present instance also a PCI bus.

Although, in the particular example described, the buses 22, 24 and 26 are all PCI buses, this is merely by way of example, and in other embodiments other bus protocols may be used and the D-bus 22 may have a different protocol from that of the PA bus and the PB bus (P buses) 24 and 26.

The processing sets 14 and 16 and the bridge 12 are operable in synchronism under the control of a common clock 20, which is connected thereto by clock signal lines 21.

Some of the devices including an Ethernet (E-NET) interface 28 and a Small Computer System Interface (SCSI) interface 29 are permanently connected to the device bus 22, but other I/O devices such as I/O devices 30, 31 and 32 can be hot insertable into individual switched slots 33, 34 and 35. Dynamic field effect transistor (FET) switching can be provided for the slots 33, 34 and 35 to enable hot insertability of the devices such as devices 30, 31 and 32. The provision of the FETs enables an increase in the length of the D bus 22 as only those devices which are active are switched on, reducing the effective total bus length. It will be appreciated that the number of I/O devices which may be connected to the D bus 22, and the number of slots provided for them, can be adjusted according to a particular implementation in accordance with specific design requirements.

Figure 2:
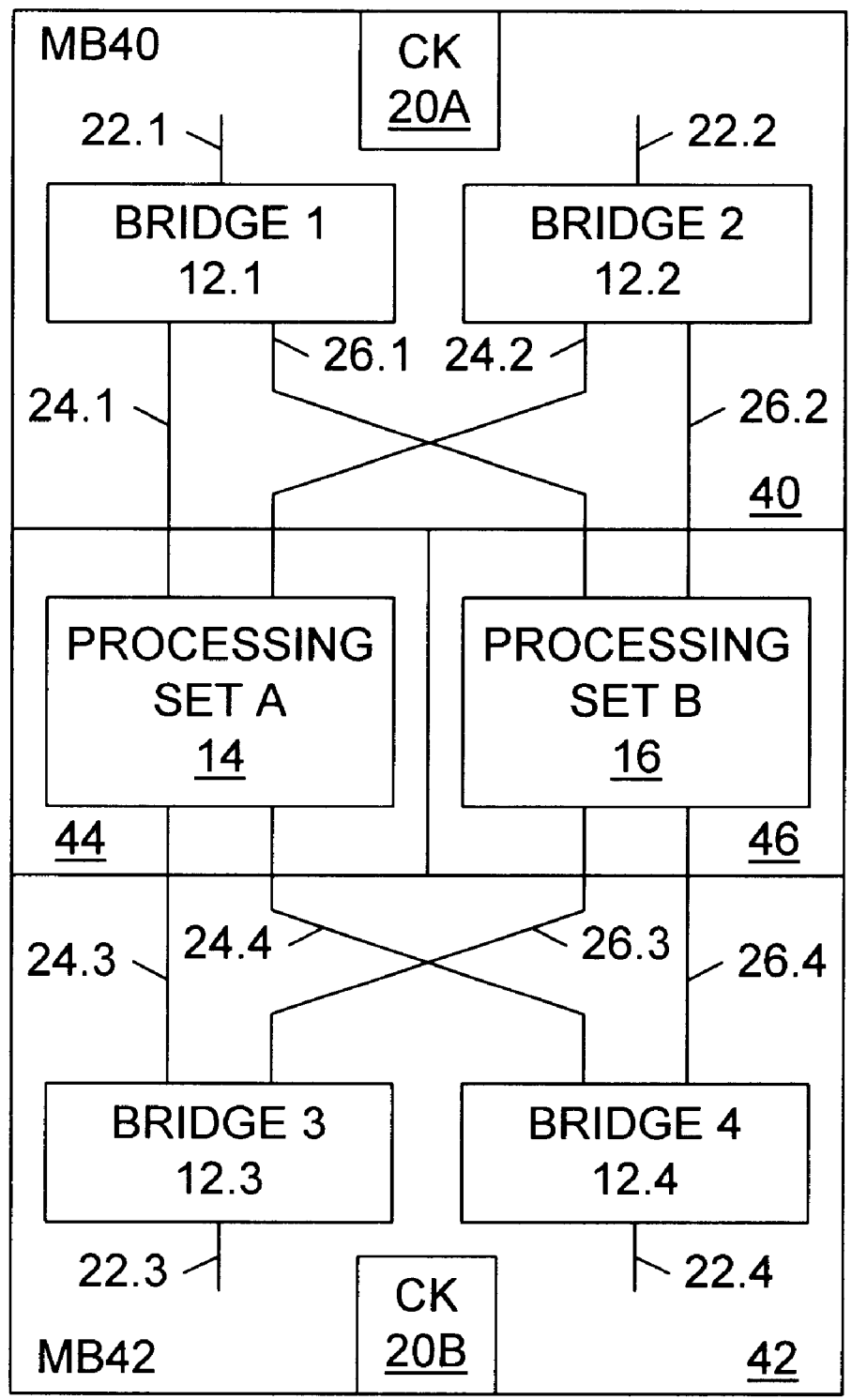
FIG. 2 is a schematic overview of a specific implementation of a system based on that of FIG. 1.

FIG. 2 is a schematic overview of a particular implementation of a fault tolerant computer employing a bridge structure of the type illustrated in FIG. 1. In FIG. 2, the fault tolerant computer system includes a plurality (here four) of bridges 12 on first and second I/O motherboards (MB 40 and MB 42) order to increase the number of I/O devices which may be connected and also to improve reliability and redundancy. Thus, in the embodiment shown in FIG. 2, two processing sets 14 and 16 are each provided on a respective processing set board 44 and 46, with the processing set boards 44 and 46 'bridging' the I/O motherboards MB 40 and MB 42. A first, master clock source 20A is mounted on the first motherboard 40 and a second, slave clock source 20B is mounted on the second motherboard 42. Clock signals are supplied to the processing set boards 44 and 46 via respective connections (not shown in FIG. 2).

First and second bridges 12.1 and 12.2 are mounted on the first I/O motherboard 40. The first bridge 12.1 is connected to the processing sets 14 and 16 by P buses 24.1 and 26.1, respectively. Similarly, the second bridge 12.2 is connected to the processing sets 14 and 16 by P buses 24.2 and 26.2, respectively. The bridge 12.1 is connected to an I/O databus (D bus) 22.1 and the bridge 12.2 is connected to an I/O databus (D bus) 22.2.

Third and fourth bridges 12.3 and 12.4 are mounted on the second I/O motherboard 42. The bridge 12.3 is connected to the processing sets 14 and 16 by P buses 24.3 and 26.3, respectively. Similarly, the bridge 4 is connected to the processing sets 14 and 16 by P buses 24.4 and 26.4, respectively. The bridge 12.3 is connected to an I/O databus (D bus) 22.3 and the bridge 12.4 is connected to an I/O databus (D bus) 22.4.

It can be seen that the arrangement shown in FIG. 2 can enable a large number of I/O devices to be connected to the two processing sets 14 and 16 via the D buses 22.1, 22.2, 22.3 and 22.4 for either increasing the range of I/O devices available, or providing a higher degree of redundancy, or both.

Figure 3:
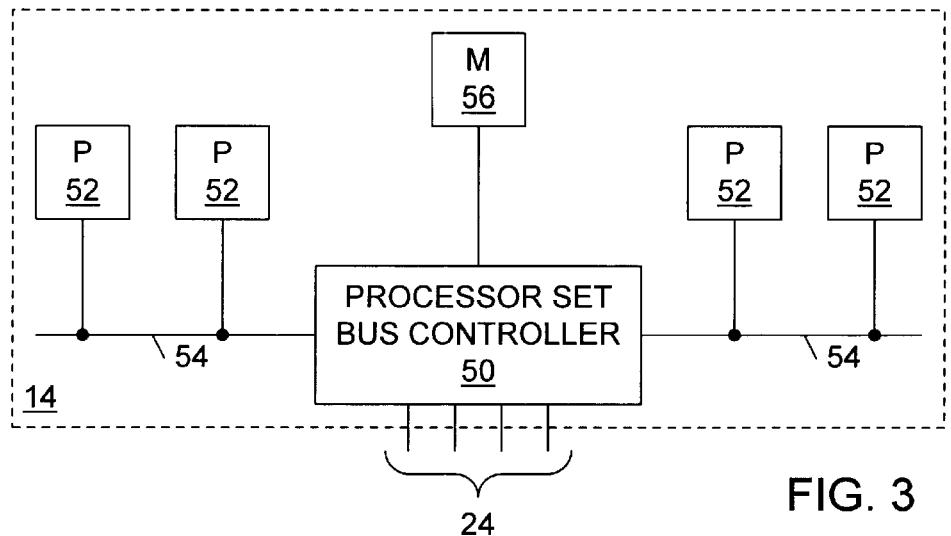
FIG. 3 is a schematic representation of one implementation of a processing set.

FIG. 3 is a schematic overview of one possible configuration of a processing set, such as the processing set 14 of FIG. 1. The processing set 16 could have the same configuration. In FIG. 3, a plurality of processors (here four) 52 are connected by one or more buses 54 to a processing set bus controller 50. As shown in FIG. 3, one or more processing set output buses 24 are connected to the processing set bus controller 50, each processing set output bus 24 being connected to a respective bridge 12. For example, in the arrangement of FIG. 1, only one processing set I/O bus (P bus) 24 would be provided, whereas in the arrangement of FIG. 2, four such processing set I/O buses (P buses) 24 would be provided. In the processing set 14 shown in FIG. 3, individual processors operate using the common memory 56, and receive inputs and provide outputs on the common P bus(es) 24.

Figure 4:
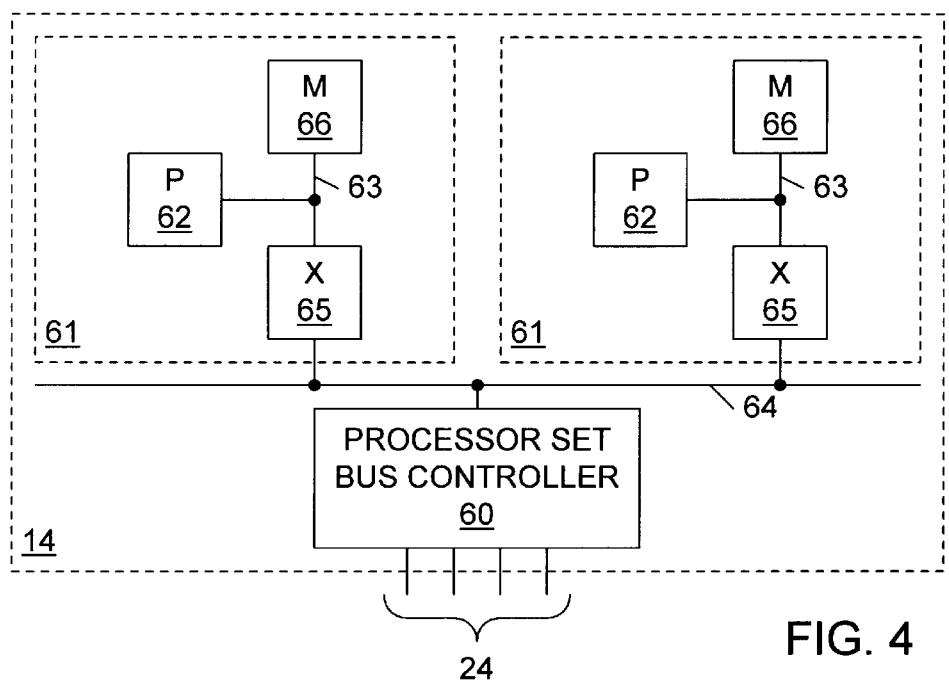
FIG. 4 is a schematic representation of another example of a processing set.

FIG. 4 is an alternative configuration of a processing set, such as the processing set 14 of FIG. 1. Here a plurality of processor/memory groups 61 are connected to a common internal bus 64. Each processor/memory group 61 includes one or more processors 62 and associated memory 66 connected to a internal group bus 63. An interface 65 connects the internal group bus 63 to the common internal bus 64. Accordingly, in the arrangement shown in FIG. 4, individual processing groups, with each of the processors 62 and associated memory 66 are connected via a common internal bus 64 to a processing set bus controller 60. The interfaces 65 enable a processor 62 of one processing group to operate not only on the data in its local memory 66, but also in the memory of another processing group 61 within the processing set 14. The processing set bus controller 60 provides a common interface between the common internal bus 64 and the processing set I/O bus(es) (P bus(es)) 24 connected to the bridge(s) 12. It should be noted that although only two processing groups 61 are shown in FIG. 4, it will be appreciated that such a structure is not limited to this number of processing groups.

Figure 5:
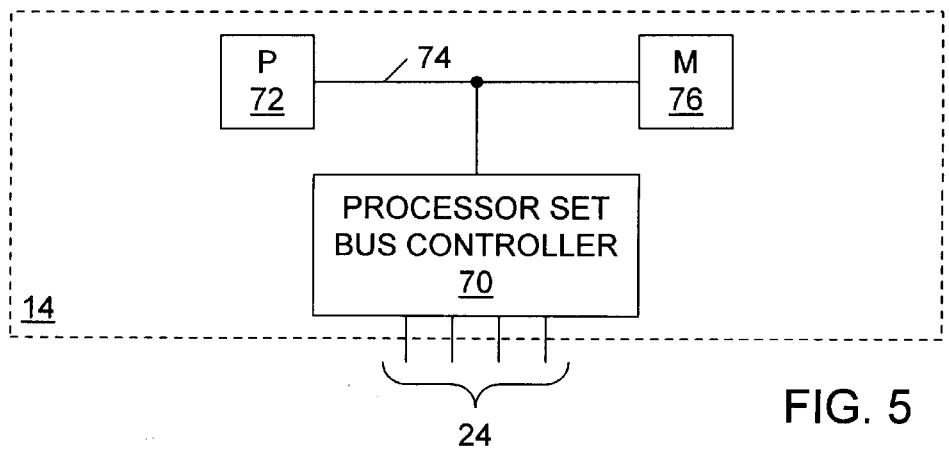
FIG. 5 is a schematic representation of a further processing set.

FIG. 5 illustrates an alternative configuration of a processing set, such as the processing set 14 of FIG. 1. Here a simple processing set includes a single processor 72 and associated memory 76 connected via a common bus 74 to a processing set bus controller 70. The processing set bus controller 70 provides an interface between the internal bus 74 and the processing set I/O bus(es) (P bus(es)) 24 for connection to the bridge(s) 12.

Accordingly, it will be appreciated from FIGS. 3, 4 and 5 that the processing set may have many different forms and that the particular choice of a particular processing set structure can be made on the basis of the processing requirement of a particular application and the degree of redundancy required. In the following description, it is assumed that the processing sets 14 and 16 referred to have a structure as shown in FIG. 3, although it will be appreciated that another form of processing set could be provided.

The bridge(s) 12 are operable in a number of operating modes. These modes of operation will be described in more detail later. However, to assist in a general understanding of the structure of the bridge, the two operating modes will be briefly summarized here. In a first, combined mode, a bridge 12 is operable to route addresses and data between the processing sets 14 and 16 (via the PA and PB buses 24 and 26, respectively) and the devices (via the D bus 22). In this combined mode, I/O cycles generated by the processing sets 14 and 16 are compared to ensure that both processing sets are operating correctly. Comparison failures force the bridge 12 into an error limiting mode (EState) in which device I/O is prevented and diagnostic information is collected. In the second, split mode, the bridge 12 routes and arbitrates addresses and data from one of the processing sets 14 and 16 onto the D bus 22 and/or onto the other one of the processing sets 16 and 14, respectively. In this mode of operation, the processing sets 14 and 16 are not synchronized and no I/O comparisons are made. DMA operations are also permitted in both modes. As mentioned above, the different modes of operation, including the combined and split modes, will be described in more detail later. However, there now follows a description of the basic structure of an example of the bridge 12.

Figure 6:
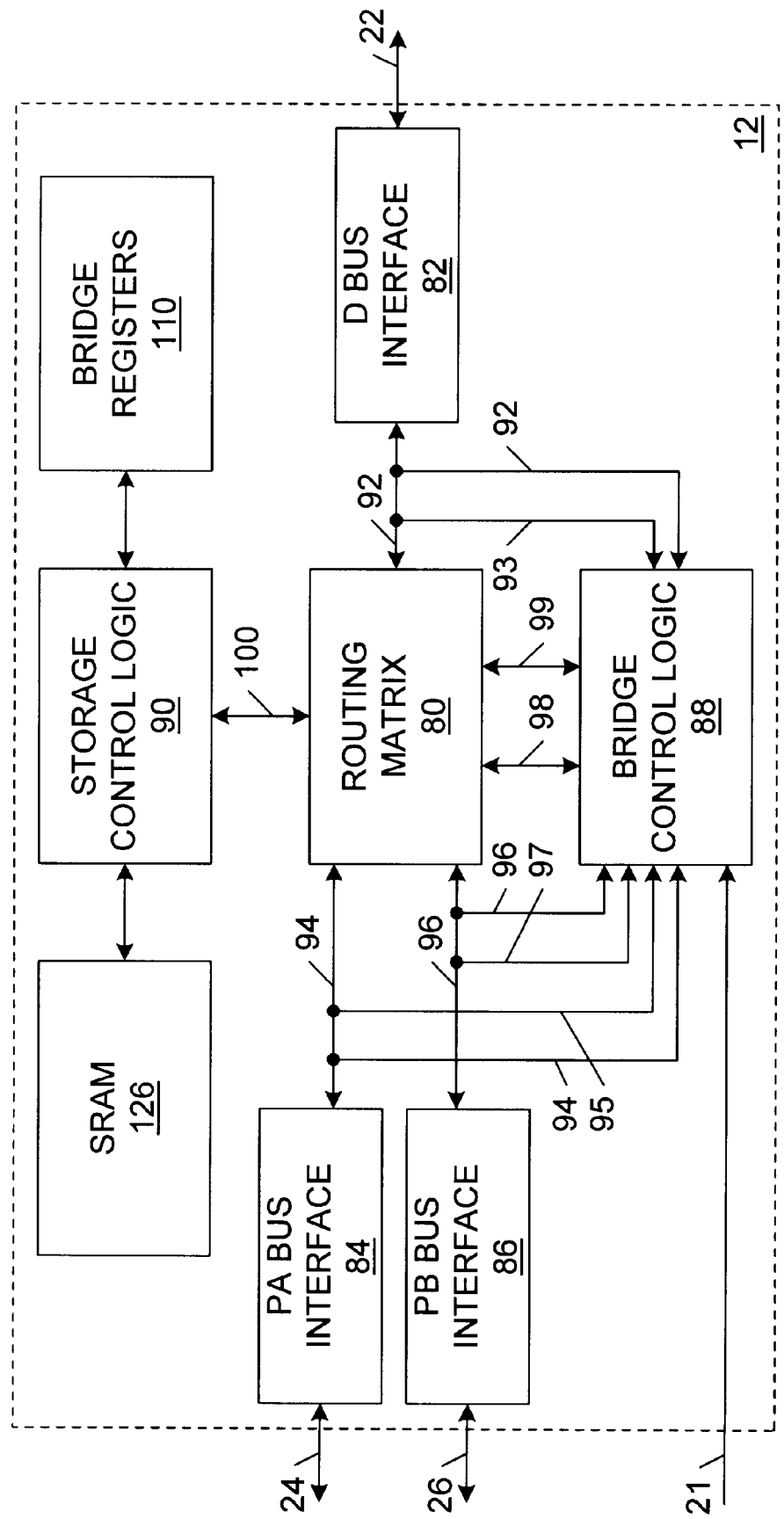
FIG. 6 is a schematic block diagram of an embodiment of a bridge for the system of FIG. 1.

FIG. 6 is a schematic functional overview of the bridge 12 of FIG. 1.

First and second processing set I/O bus interfaces, PA bus interface 84 and PB bus interface 86, are connected to the PA and PB buses 24 and 26, respectively. A device I/O bus interface, D bus interface 82, is connected to the D bus 22.

It should be noted that the PA, PB and D bus interfaces need not be configured as separate elements but could be incorporated in other elements of the bridge. Accordingly, within the context of this document, where a references is made to a bus interface, this does not require the presence of a specific separate component, but rather the capability of the bridge to connect to the bus concerned, for example by means of physical or logical bridge connections for the lines of the buses concerned.

Routing (hereinafter termed a routing matrix) 80 is connected via a first internal path 94 to the PA bus interface 84 and via a second internal path 96 to the PB bus interface 86. The routing matrix 80 is further connected via a third internal path 92 to the D bus interface 82. The routing matrix 80 is thereby able to provide I/O bus transaction routing in both directions between the PA and PB bus interfaces 84 and 86. It is also able to provide routing in both directions between one or both of the PA and PB bus interfaces and the D bus interface 82. The routing matrix 80 is connected via a further internal path 100 to storage control logic 90. The storage control logic 90 controls access to bridge registers 110 and to a random access memory (SRAM) 126. The routing matrix 80 is therefore also operable to provide routing in both directions between the PA, PB and D bus interfaces 84, 86 and 82 and the storage control logic 90. The routing matrix 80 is controlled by bridge control logic 88 over control paths 98 and 99. The bridge control logic 88 is responsive to control signals, data and addresses on internal paths 93, 95 and 97, and also to clock signals on the clock line(s) 21.

In the embodiment of the invention, each of the P buses (PA bus 24 and PB bus 26) operates under a PCI protocol. The processing set bus controllers 50 (see FIG. 3) also operate under the PCI protocol. Accordingly, the PA and PB bus interfaces 84 and 86 each provide all the functionality required for a compatible interface providing both master and slave operation for data transferred to and from the D bus 22 or internal memories and registers of the bridge in the storage subsystem 90. The bus interfaces 84 and 86 can provide diagnostic information to internal bridge status registers in the storage subsystem 90 on transition of the bridge to an error state (EState) or on detection of an I/O error.

The device bus interface 82 performs all the functionality required for a PCI compliant master and slave interface for transferring data to and from one of the PA and PB buses 84 and 86. The D bus 82 is operable during direct memory access (DMA) transfers to provide diagnostic information to internal status registers in the storage subsystem 90 of the bridge on transition to an EState or on detection of an I/O error.

Figure 7:
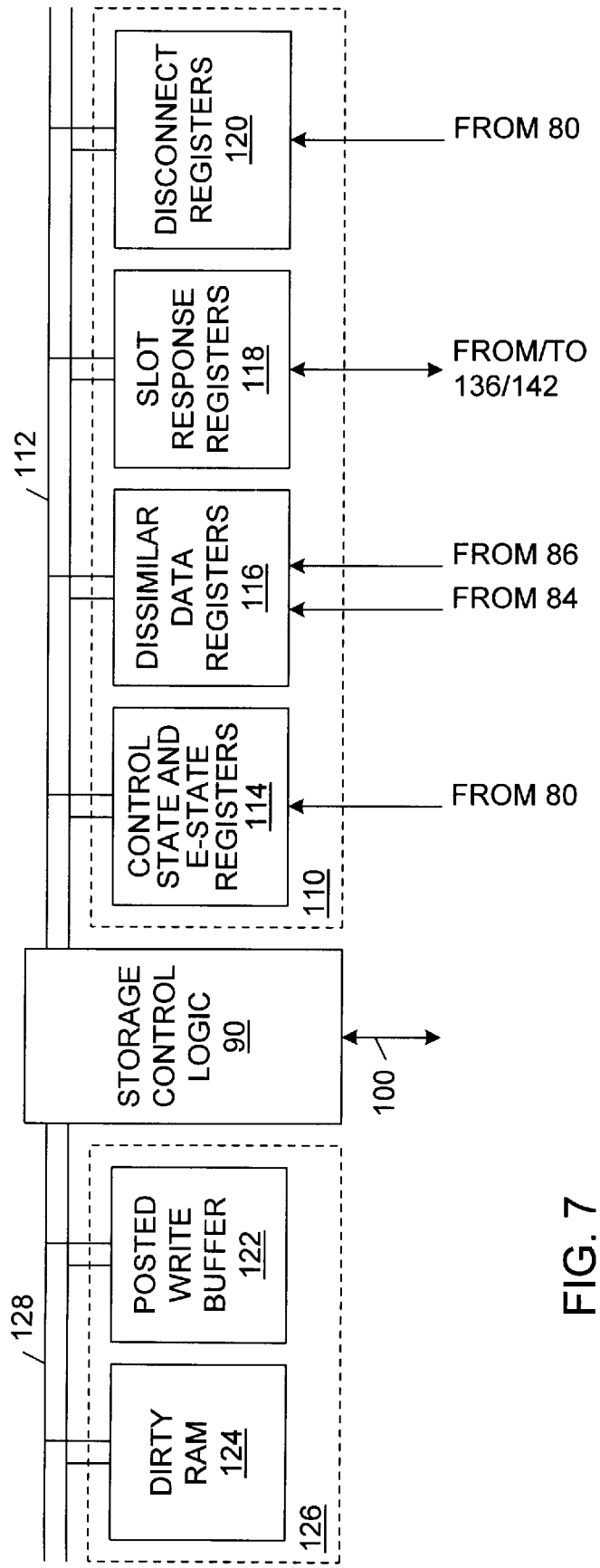
FIG. 7 is a schematic block diagram of storage for the bridge of FIG. 6.

FIG. 7 illustrates in more detail the bridge registers 110 and the SRAM 124. The storage control logic 110 is connected via a path (e.g. a bus) 112 to a number of register components 114, 116, 118, 120. The storage control logic is also connected via a path (e.g. a bus) 128 to the SRAM 126 in which a posted write buffer component 122 and a dirty RAM component 124 are mapped. Although a particular configuration of the components 114, 116, 118, 120, 122 and 124 is shown in FIG. 7, these components may be configured in other ways, with other components defined as regions of a common memory (e.g. a random access memory such as the SRAM 126, with the path 112/128 being formed by the internal addressing of the regions of memory). As shown in FIG. 7, the posted write buffer 122 and the dirty RAM 124 are mapped to different regions of the SRAM memory 126, whereas the registers 114, 116, 118 and 120 are configured as separate from the SRAM memory.

Control and status registers (CSRs) 114 form internal registers which allow the control of various operating modes of the bridge, allow the capture of diagnostic information for an EState and for I/O errors, and control processing set access to PCI slots and devices connected to the D bus 22. These registers are set by signals from the routing matrix 80.

Dissimilar data registers (DDRs) 116 provide locations for containing dissimilar data for different processing sets to enable non-deterministic data events to be handled. These registers are set by signals from the PA and PB buses.

Bridge decode logic enables a common write to disable a data comparator and allow writes to two DDRs 116, one for each processing set 14 and 16.

A selected one of the DDRs can then be read in-sync by the processing sets 14 and 16. The DDRs thus provide a mechanism enabling a location to be reflected from one processing set (14/16) to another (16/14).

Slot response registers (SRRs) 118 determine ownership of device slots on the D bus 22 and to allow DMA to be routed to the appropriate processing set(s). These registers are linked to address decode logic.

Disconnect registers 120 are used for the storage of data phases of an I/O cycle which is aborted while data is in the bridge on the way to another bus. The disconnect registers 120 receive all data queued in the bridge when a target device disconnects a transaction, or as the EState is detected. These registers are connected to the routing matrix 80. The routing matrix can queue up to three data words and byte enables. Provided the initial addresses are voted as being equal, address target controllers derive addresses which increment as data is exchanged between the bridge and the destination (or target). Where a writer (for example a processor I/O write, or a DVMA (D bus to P bus access)) is writing data to a target, this data can be caught in the bridge when an error occurs. Accordingly, this data is stored in the disconnect registers 120 when an error occurs. These disconnect registers can then be accessed on recovery from an EState to recover the data associated with the write or read cycle which was in progress when the EState was initiated.

Although shown separately, the DDRs 116, the SRRs 118 and the disconnect registers may form an integral part of the CSRs 114.

EState and error CSRs 114 provided for the capture of a failing cycle on the P buses 24 and 26, with an indication of the failing datum. Following a move to an EState, all of the writes initiated to the P buses are logged in the posted write buffer 122. These may be other writes that have been posted in the processing set bus controllers 50, or which may be initiated by software before an EState interrupt causes the processors to stop carrying out writes to the P buses 24 and 26.

A dirty RAM 124 is used to indicate which pages of the main memory 56 of the processing sets 14 and 16 have been modified by direct memory access (DMA) transactions from one or more devices on the D bus 22. Each page (e.g. each 8K page) is marked by a single bit in the dirty RAM 124 which is set when a DMA write occurs and can be cleared by a read and clear cycle initiated on the dirty RAM 124 by a processor 52 of a processing set 14 and 16.

The dirty RAM 124 and the posted write buffer 118 may both be mapped into the memory 124 in the bridge 12. This memory space can be accessed during normal read and write cycles for testing purposes.

Figure 8:
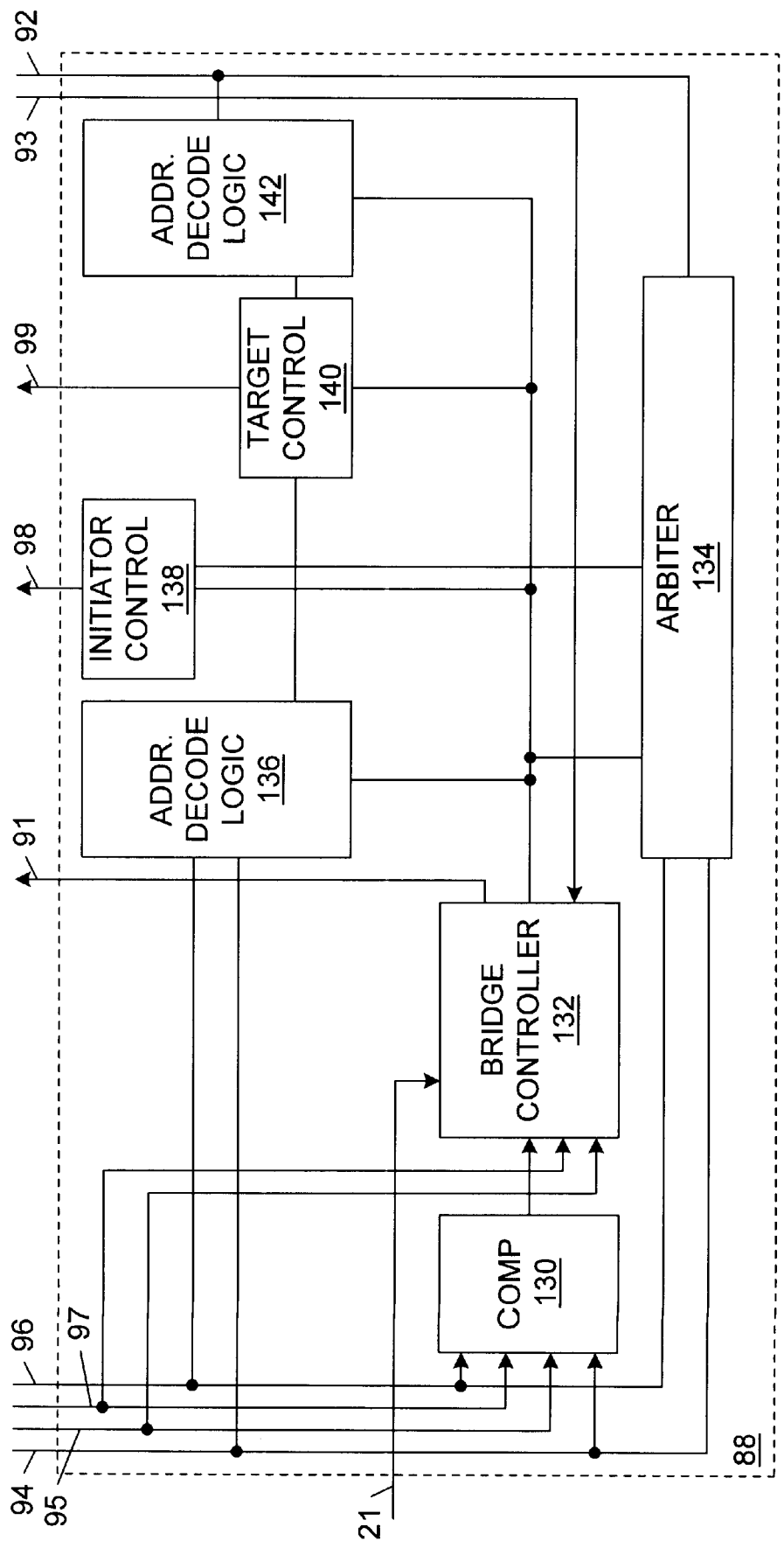
FIG. 8 is a schematic block diagram of control logic of the bridge of FIG. 6.

FIG. 8 is a schematic functional overview of the bridge control logic 88 shown in FIG. 6.

All of the devices connected to the D bus 22 are addressed geographically. Accordingly, the bridge carries out decoding necessary to enable the isolating FETs for each slot before an access to those slots is initiated.

The address decoding performed by the address decode logic 136 and 138 essentially permits four basic access types:

an out-of-sync access (i.e. not in the combined mode) by one processing set (e.g. processing set 14 of FIG. 1) to the other processing set (e.g. processing set 16 of FIG. 1), in which case the access is routed from the PA bus interface 84 to the PB bus interface 86;

an access by one of the processing sets 14 and 16 in the split mode, or both processing sets 14 and 16 in the combined mode to an I/O device on the D bus 22, in which case the access is routed via the D bus interface 82;

a DMA access by a device on the D bus 22 to one or both of the processing sets 14 and 16, which would be directed to both processing sets 14 and 16 in the combined mode, or to the relevant processing set 14 or 16 if out-of-sync, and if in a split mode to a processing set 14 or 16 which owns a slot in which the device is located; and a PCI configuration access to devices in I/O slots.

As mentioned above, geographic addressing is employed. Thus, for example, slot 0 on motherboard A has the same address when referred to by processing set 14 or by processing set 16.

Geographic addressing is used in combination with the PCI slot FET switching. During a configuration access mentioned above, separate device select signals are provided for devices which are not FET isolated. A single device select signal can be provided for the switched PCI slots as the FET signals can be used to enable a correct card. Separate FET switch lines are provided to each slot for separately switching the FETs for the slots.

The SRRs 118, which could be incorporated in the CSR registers 114, are associated with the address decode functions. The SRRs 118 serve in a number of different roles which will be described in more detail later. However, some of the roles are summarized here.

In a combined mode, each slot may be disabled so that writes are simply acknowledged without any transaction occurring on the device bus 22, whereby the data is lost. Reads will return meaningless data, once again without causing a transaction on the device board.

In the split mode, each slot can be in one of three states. The states are:

Not owned;

Owned by processing set A 14;

Owned by processing set B 16.

A slot that is not owned by a processing set 14 or 16 making an access (this includes not owned or un-owned slots) cannot be accessed. Accordingly, such an access is aborted.

When a processing set 14 or 16 is powered off, all slots owned by it move to the un-owned state. A processing set 14 or 16 can only claim an un-owned slot, it cannot wrest ownership away from another processing set. This can only be done by powering off the other processing set, or by getting the other processing set to relinquish ownership.

The ownership bits are assessable and settable while in the combined mode, but have no effect until a split state is entered. This allows the configuration of a split system to be determined while still in the combined mode.

Each PCI device is allocated an area of the processing set address map. The top bits of the address are determined by the PCI slot. Where a device carries out DMA, the bridge is able to check that the device is using the correct address because a D bus arbiter informs the bridge which device is using the bus at a particular time. If a device access is a processing set address which is not valid for it, then the device access will be ignored. It should be noted that an address presented by a device will be a virtual address which would be translated by an I/O memory management unit in the processing set bus controller 50 to an actual memory address.

The addresses output by the address decoders are passed via the initiator and target controllers 138 and 140 to the routing matrix 80 via the lines 98 under control of a bridge controller 132 and an arbiter 134.

An arbiter 134 is operable in various different modes to arbitrate for use of the bridge on a first-come-first-served basis using conventional PCI bus signals on the P and D buses.

In a combined mode, the arbiter 134 is operable to arbitrate between the in-sync processing sets 14 and 16 and any initiators on the device bus 22 for use of the bridge 12. Possible scenarios are:

processing set access to the device bus 22;

processing set access to internal registers in the bridge 12;

Device access to the processing set memory 56.

In split mode, both processing sets 14 and 16 must arbitrate the use of the ridge and thus access to the device bus 22 and internal bridge registers (e.g. CSR registers 114). The bridge 12 must also contend with initiators on the device bus 22 or use of that device bus 22.

Each slot on the device bus has an arbitration enable bit associated with it. These arbitration enable bits are cleared after reset and must be set to allow a slot to request a bus. When a device on the device bus 22 is suspected of providing an I/O error, the arbitration enable bit for that device is automatically reset by the bridge.

A PCI bus interface in the processing set bus controller(s) 50 expects to be the master bus controller for the P bus concerned, that is it contains the PCI bus arbiter for the PA or PB bus to which it is connected. The bridge 12 cannot directly control access to the PA and PB buses 24 and 26. The bridge 12 competes for access to the PA or PB bus with the processing set on the bus concerned under the control of the bus controller 50 on the bus concerned.

Also shown in FIG. 8 is a comparator 130 and a bridge controller 132. The comparator 130 is operable to compare I/O cycles from the processing sets 14 and 16 to determine any out-of-sync events. On determining an out-of-sync event, the comparator 130 is operable to cause the bridge controller 132 to activate an EState for analysis of the out-of-sync event and possible recovery therefrom.

Figure 9:
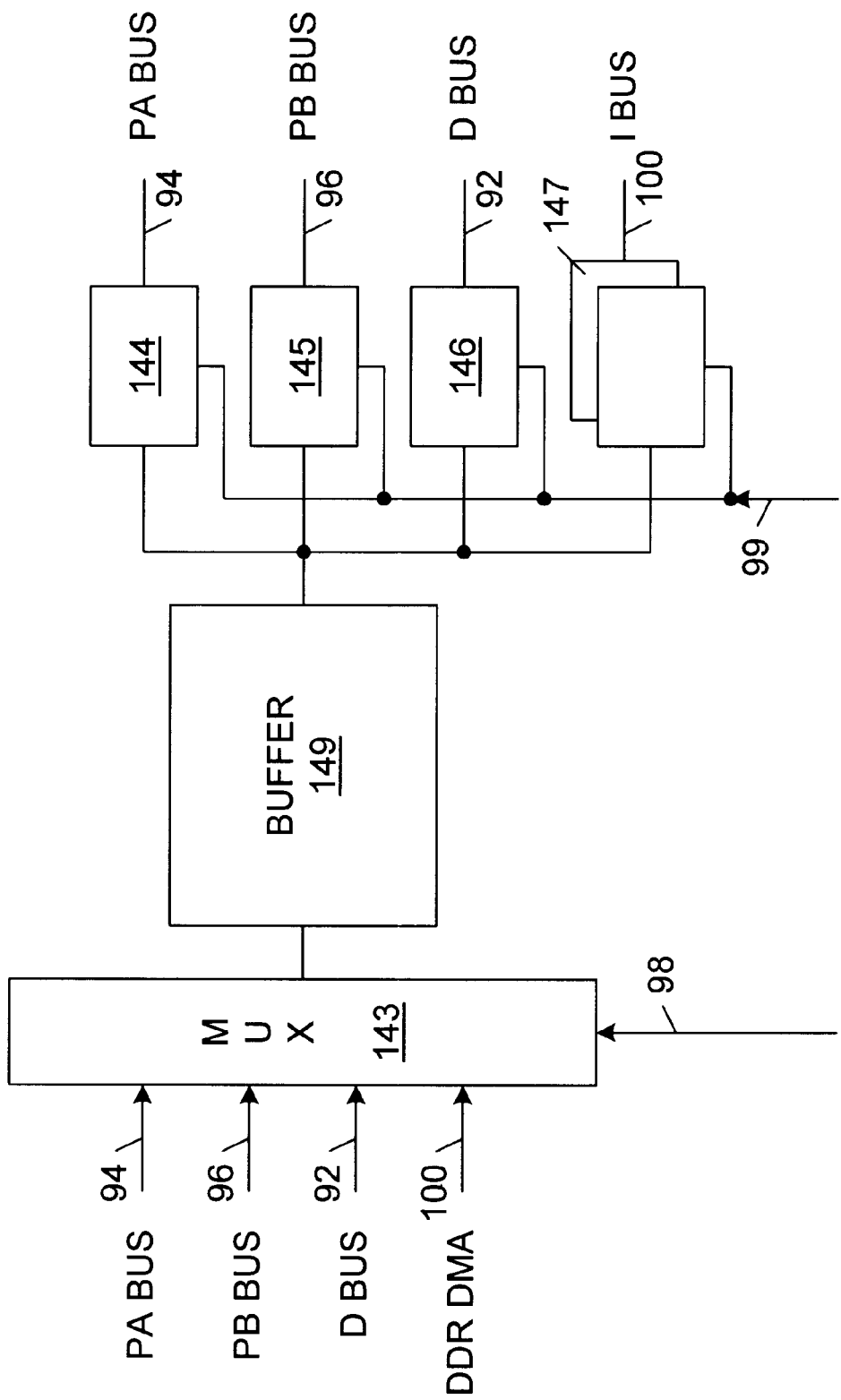
FIG. 9 is a schematic representation of a routing matrix of the bridge of FIG. 6.

FIG. 9 is a schematic functional overview of the routing matrix 80.

The routing matrix 80 comprises a multiplexer 143 which is responsive to initiator control signals 98 from the initiator controller 138 of FIG. 8 to select one of the PA bus path 94, PB bus path 96, D bus path 92 or internal bus path 100 as the current input to the routing matrix. Separate output buffers 144, 145, 146 and 147 are provided for output to each of the paths 94, 96, 92 and 100, with those buffers being selectively enabled by signals 99 from the target controller 140 of FIG. 8. Between the multiplexer and the buffers 144–147 signals are held in a buffer 149. In the present embodiment three cycles of data for an I/O cycle will be held in the pipeline represented by the multiplexer 143, the buffer 149 and the buffers 144.

Figure 10:
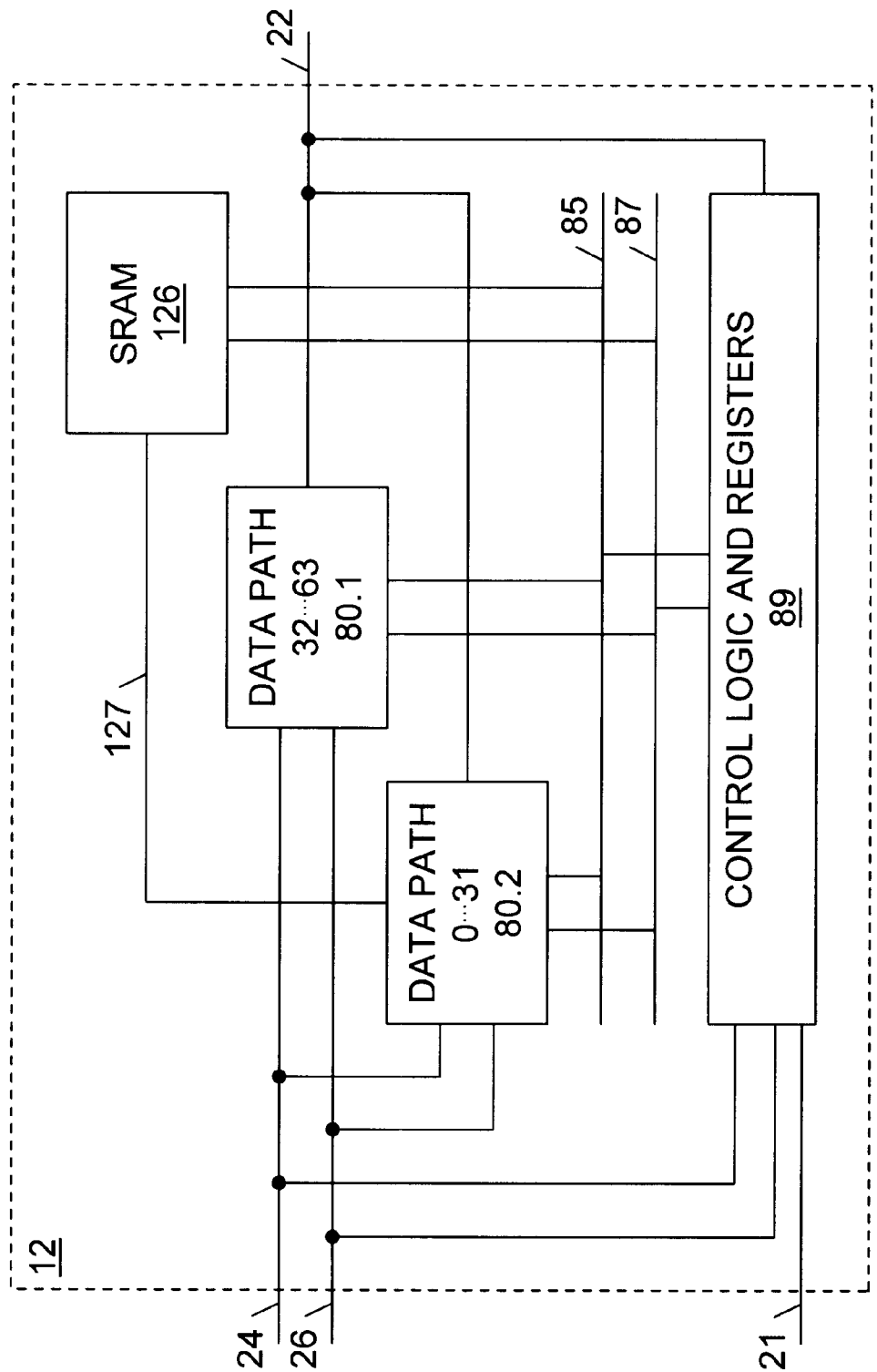
FIG. 10 is an example implementation of the bridge of FIG. 6.

In FIGS. 6 to 9 a functional description of elements of the bridge has been given. FIG. 10 is a schematic representation of a physical configuration of the bridge in which the bridge control logic 88, the storage control logic 90 and the bridge registers 110 are implemented in a first field programmable gate array (FPGA) 89, the routing matrix 80 is implemented in further FPGAs 80.1 and 80.2 and the SRAM 126 is implemented as one or more separate SRAMs addressed by a address control lines 127. The bus interfaces 82, 84 and 86 shown in FIG. 6 are not separate elements, but are integrated in the FPGAs 80.1, 80.2 and 89. Two FPGAs 80.1 and 80.2 are used for the upper 32 bits 32–63 of a 64 bit PCI bus and the lower 32 bits 0–31 of the 64 bit PCI bus. It will be appreciated that a single FPGA could be employed for the routing matrix 80 where the necessary logic can be accommodated within the device. Indeed, where a FPGA of sufficient capacity is available, the bridge control logic, storage control logic and the bridge registers could be incorporated in the same FPGA as the routing matrix. Indeed many other configurations may be envisaged, and indeed technology other than FPGAs, for example one or more Application Specific Integrated Circuits (ASICs) may be employed. As shown in FIG. 10, the FPGAs 89, 80.1 and 80.2 and the SRAM 126 are connected via internal bus paths 85 and path control lines 87.

Figure 11:
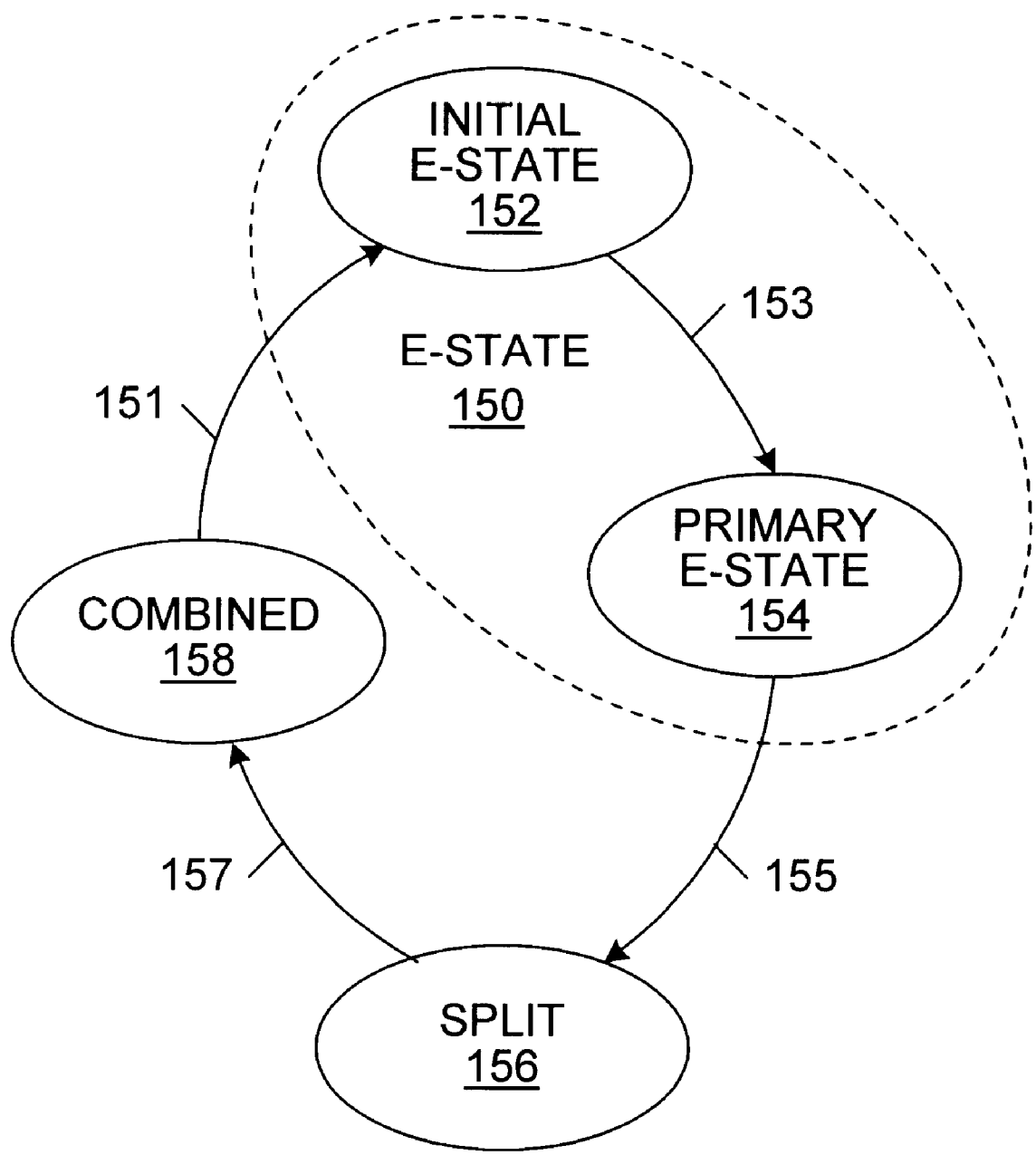
FIG. 11 is a state diagram illustrating operational states of the bridge of FIG. 6.

FIG. 11 is a transition diagram illustrating in more detail the various operating modes of the bridge. The bridge operation can be divided into three basic modes, namely an error state (EState) mode 150, a split state mode 156 and a combined state mode 158. The EState mode 150 can be further divided into 2 states.

After initial resetting on powering up the bridge, or following an out-of sync event, the bridge is in this initial EState 152. In this state, all writes are stored in the posted write buffer 120 and reads from the internal bridge registers (e.g., the CSR registers 116) are allowed, and all other reads are treated as errors (i.e. they are aborted). In this state, the individual processing sets 14 and 16 perform evaluations for determining a restart time. Each processing set 14 and 16 will determine its own restart timer timing. The timer setting depends on a "blame" factor for the transition to the EState. A processing set which determines that it is likely to have caused the error sets a long time for the timer. A processing set which thinks it unlikely to have caused the error sets a short time for the timer. The first processing set 14 and 16 which times out, becomes a primary processing set. Accordingly, when this is determined, the bridge moves (153) to the primary EState 154.

When either processing set 14/16 has become the primary processing set, the bridge is then operating in the primary EState 154. This state allows the primary processing set to write to bridge registers (specifically the SRRs 118). Other writes are no longer stored in the posted write buffer, but are simply lost. Device bus reads are still aborted in the primary EState 154.

Once the EState condition is removed, the bridge then moves (155) to the split state 156. In the split state 156, access to the device bus 22 is controlled by the SRR registers 118 while access to the bridge storage is simply arbitrated. The primary status of the processing sets 14 and 16 is ignored. Transition to a combined operation is achieved by means of a sync_reset (157). After issue of the sync_reset operation, the bridge is then operable in the combined state 158, whereby all read and write accesses on the D bus 22 and the PA and PB buses 24 and 26 are allowed. All such accesses on the PA and PB buses 24 and 26 are compared in the comparator 130. Detection of a mismatch between any read and write cycles (with an exception of specific dissimilar data I/O cycles) cause a transition 151 to the EState 150. The various states described are controlled by the bridge controller 132.

The role of the comparator 130 is to monitor and compare I/O operations on the PA and PB buses in the combined state 151 and, in response to a mismatched signal, to notify the bridge controller 132, whereby the bridge controller 132 causes the transition 152 to the error state 150. The I/O operations can include all I/O operations initiated by the processing sets, as well as DMA transfers in respect of DMA initiated by a device on the device bus.

Table 1 below summarizes the various access operations which are allowed in each of the operational states

TABLE 1

|  | D Bus-Read | D Bus-Write |
| --- | --- | --- |
| E State | Master Abort | Stored in Post Write Buffer |
| Primary EState | Master Abort | Lost |
| Split | Controlled by SRR bits and arbitrated | Controlled by SRR bits and arbitrated |
| Combined | Allowed and compared | Allowed and compared |

As described above, after an initial reset, the system is in the initial EState 152. In this state, neither processing sets 14 or 16 can access the D bus 22 or the P bus 26 or 24 of the other processing set 16 or 14. The internal bridge registers 116 of the bridge are accessible, but are read only.

A system running in the combined mode 158 transitions to the EState 150 where there is a comparison failure detected in this bridge, or alternatively a comparison failure is detected in another bridge in a multi-bridge system as shown, for example, in FIG. 2. Also, transitions to an EState 150 can occur in other situations, for example in the case of a software controlled event forming part of a self test operation.

On moving to the EState 150, an interrupt is signaled to all or a subset of the processors of the processing sets via an interrupt line 95. Following this, all I/O cycles generated on a P bus 24 or 26 result in reads being returned with an exception and writes being recorded in the posted write buffer.

The operation of the comparator 130 will now be described in more detail. The comparator is connected to paths 94, 95, 96 and 97 for comparing address, data and selected control signals from the PA and PB bus interfaces 84 and 86. A failed comparison of in-sync accesses to device I/O bus 22 devices causes a move from the combined state 158 to the EState 150.

For processing set I/O read cycles, the address, command, address parity, byte enables and parity error parameters are compared.

If the comparison fails during the address phase, the bridge asserts a retry to the processing set bus controllers 50, which prevents data leaving the I/O bus controllers 50. No activity occurs in this case on the device I/O bus 22. On the processor(s) retrying, no error is returned.

If the comparison fails during a data phase (only control signals and byte enables are checked), the bridge signals a target-abort to the processing set bus controllers 50. An error is returned to the processors.

In the case of processing set I/O bus write cycles, the address, command, parity, byte enables and data parameters are compared.

If the comparison fails during the address phase, the bridge asserts a retry to the processing set bus controllers 50, which results in the processing set bus controllers 50 retrying the cycle again. The posted write buffer 122 is then active. No activity occurs on the device I/O bus 22.

If the comparison fails during the data phase of a write operation, no data is passed to the D bus 22. The failing data and any other transfer attributes from both processing sets 14 and 16 are stored in the disconnect registers 122, and any subsequent posted write cycles are recorded in the posted write buffer 118.

In the case of direct virtual memory access (DVMA) reads, the data control and parity are checked for each datum. If the data does not match, the bridge 12 terminates the transfer on the P bus. In the case of DVMA writes, control and parity error signals are checked for correctness.

Other signals in addition to those specifically mentioned above can be compared to give an indication of divergence of the processing sets. Examples of these are bus grants and various specific signals during processing set transfers and during DMA transfers.

Errors fall roughly into two types, those which are made visible to the software by the processing set bus controller 50 and those which are not made visible by the processing set bus controller 50 and hence need to be made visible by an interrupt from the bridge 12. Accordingly, the bridge is operable to capture errors reported in connection with processing set read and write cycles, and DMA reads and writes.

Clock control for the bridge is performed by the bridge controller 132 in response to the clock signals from the clock line 21. Individual control lines from the controller 132 to the various elements of the bridge are not shown in FIGS. 6 to 10.

Figure 12:
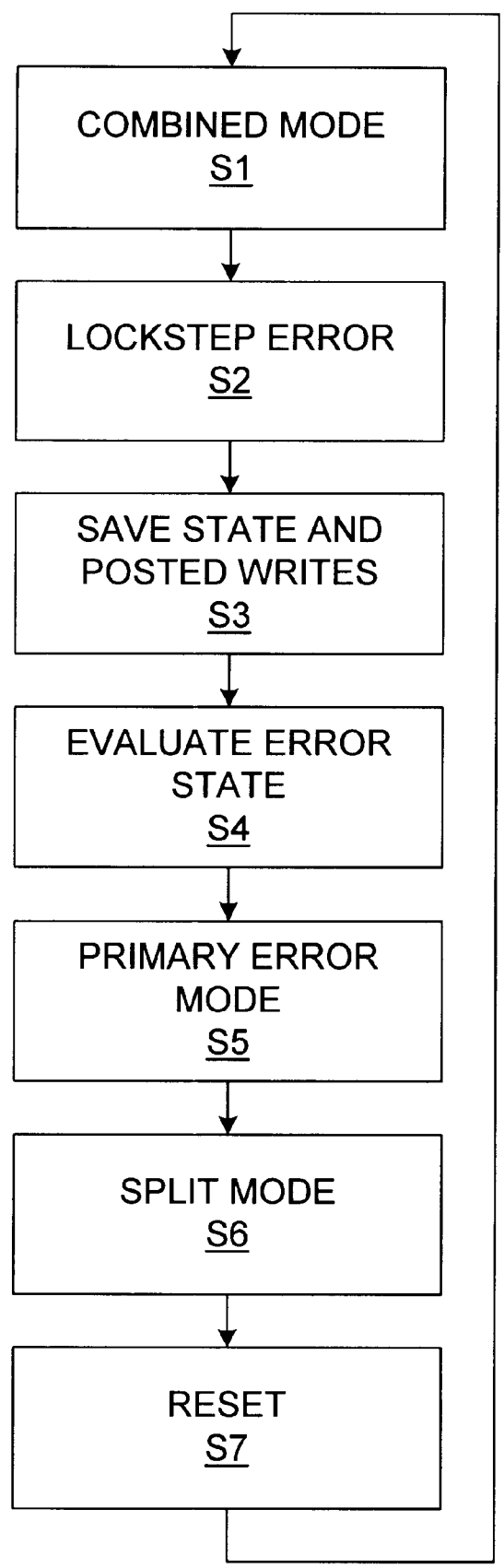
FIG. 12 is a flow diagram illustrating stages in the operation of the bridge of FIG. 6.

FIG. 12 is a flow diagram illustrating a possible sequence of operating stages where lockstep errors are detected during a combined mode of operation.

Stage S1 represents the combined mode of operation where lockstep error checking is performed by the comparator 130 shown in FIG. 8.

In Stage S2, a lockstep error is assumed to have been detected by the comparator 130.

In Stage S3, the current state is saved in the CSR registers 114 and posted writes are saved in the posted write buffer 122 and/or in the disconnect registers 120.

Figure 13:
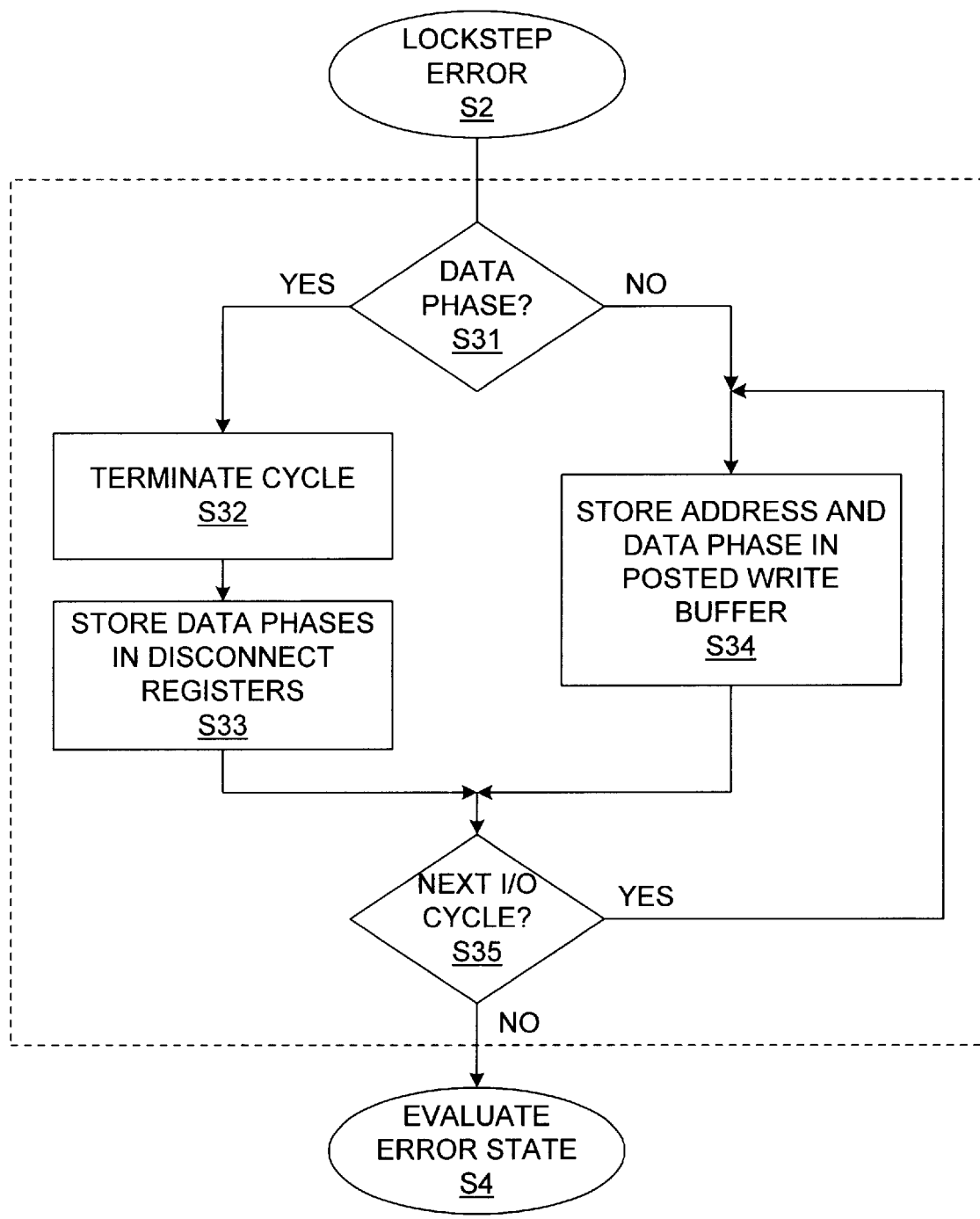
FIG. 13 is a detail of a stage of operation from FIG. 12.

FIG. 13 illustrates Stage S3 in more detail. Accordingly, in Stage S31, the bridge controller 132 detects whether the lockstep error notified by the comparator 130 has occurred during a data phase in which it is possible to pass data to the device bus 22. In this case, in Stage S32, the bus cycle is terminated. Then, in Stage S33 the data phases are stored in the disconnect registers 120 and control then passes to Stage S35 where an evaluation is made as to whether a further I/O cycle needs to be stored. Alternatively, if at Stage S31, it is determined that the lockstep error did not occur during a data phase, the address and data phases for any posted write I/O cycles are stored in the posted write buffer 122. At Stage S34, if there are any further posted write I/O operations pending, these are also stored in the posted write buffer 122.

Stage S3 is performed at the initiation of the initial error state 152 shown in FIG. 11. In this state, the first and second processing sets arbitrate for access to the bridge. Accordingly, in Stage S31–S35, the posted write address and data phases for each of the processing sets 14 and 16 are stored in separate portions of the posted write buffer 122, and/or in the single set of disconnect registers as described above.

Figure 14:
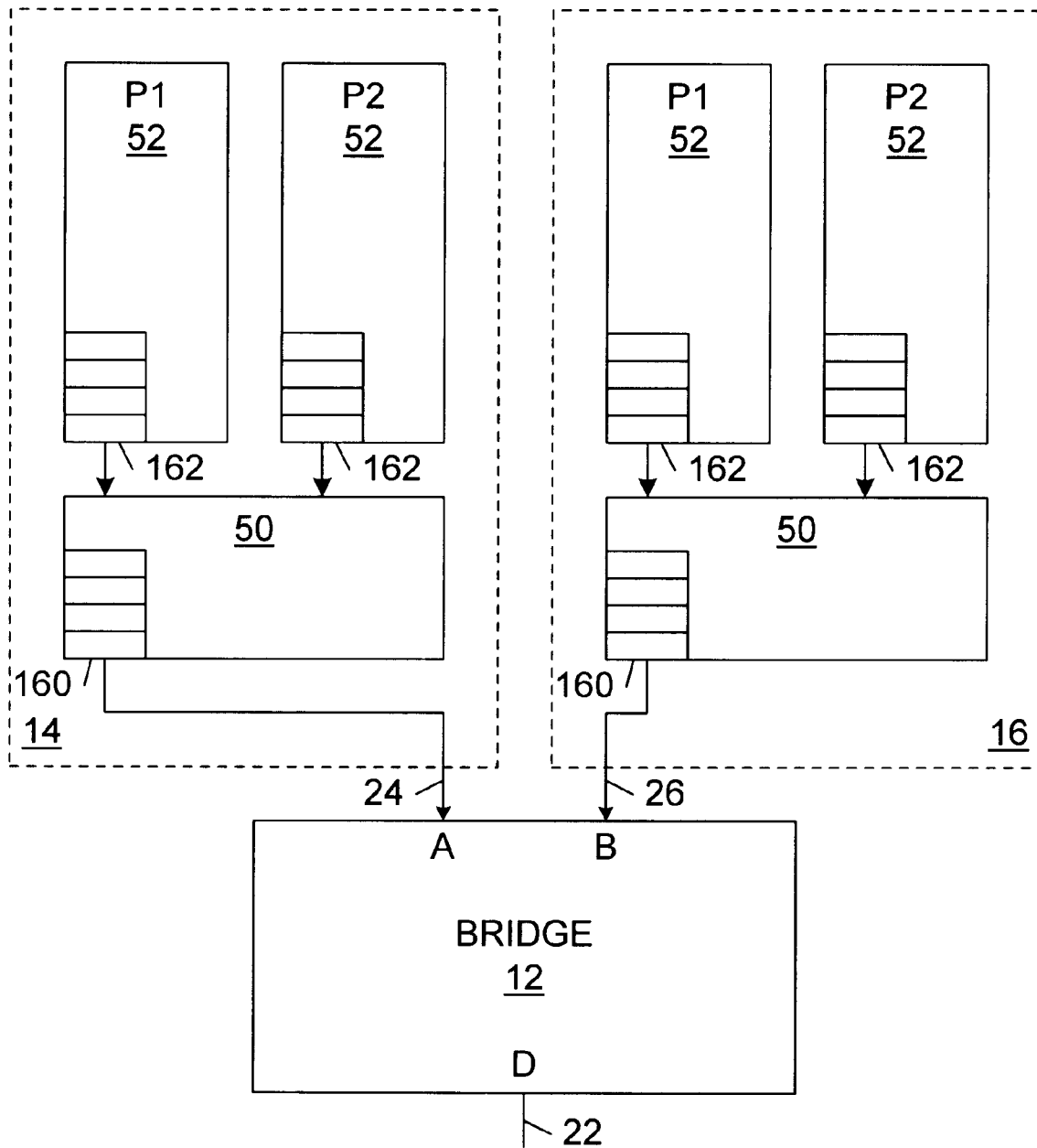
FIG. 14 illustrates the posting of I/O cycles in the system of FIG. 1.

FIG. 14 illustrates the source of the posted write I/O cycles which need to be stored in the posted write buffer 122. During normal operation of the processing sets 14 and 16, output buffers 162 in the individual processors contain I/O cycles which have been posted for transfer via the processing set bus controllers 50 to the bridge 12 and eventually to the device bus 22. Similarly, buffers 160 in the processing set controllers 50 also contain posted I/O cycles for transfer over the buses 24 and 26 to the bridge 12 and eventually to the device bus 22.

Accordingly, it can be seen that when an error state occurs, I/O write cycles may already have been posted by the processors 52, either in their own buffers 162, or already transferred to the buffers 160 of the processing set bus controllers 50. It is the I/O write cycles in the buffers 162 and 160 which gradually propagate through and need to be stored in the posted write buffer 122.

Figure 15:
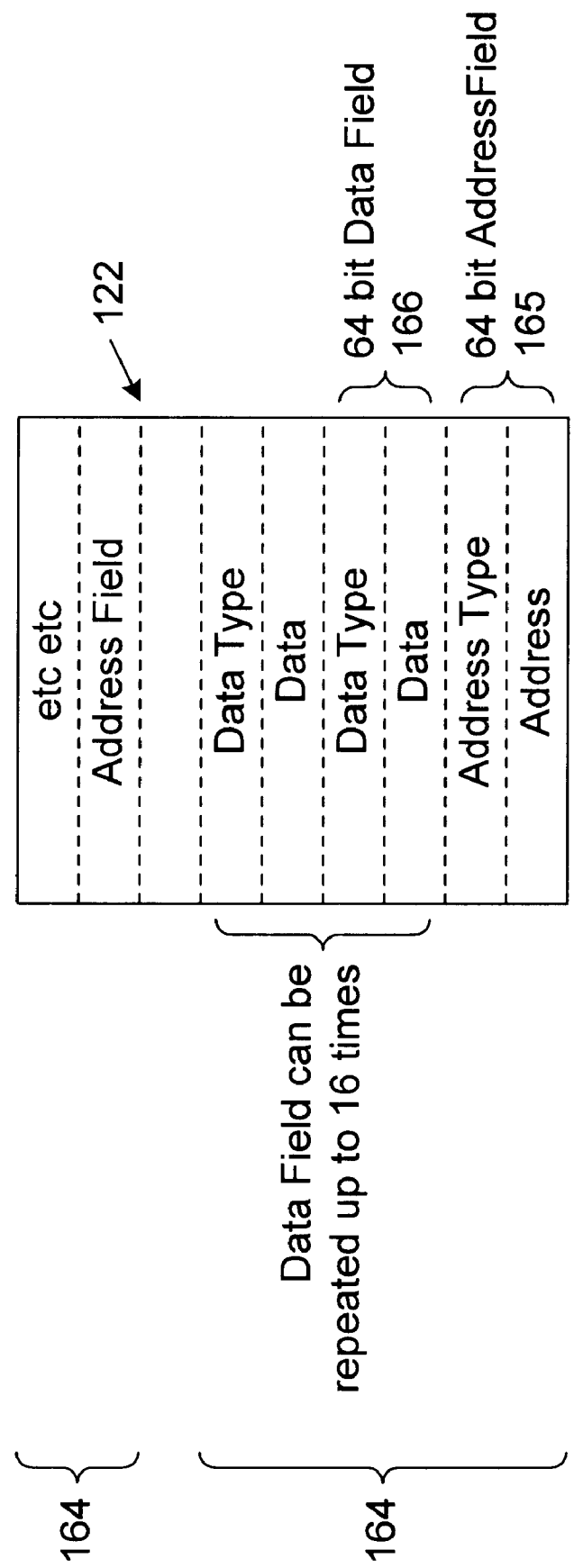
FIG. 15 illustrates the data stored in a posted write buffer.

As shown in FIG. 15, a write cycle 164 posted to the posted write buffer 122 can comprise an address field 165 including an address and an address type, and between one and 16 data fields 166 including a byte enable field and the data itself.

The data is written into the posted write buffer 122 in the EState unless the initiating processing set has been designated as a primary CPU set. At that time, non-primary writes in an EState still go to the posted write buffer even after one of the CPU sets has become a primary processing set. An address pointer in the CSR registers 114 points to the next available posted write buffer address, and also provides an overflow bit which is set when the bridge attempts to write past of the top of the posted write buffer for any one of the processing sets 14 and 16. Indeed, in the present implementation, only the first 16 K of data is recorded in each buffer. Attempts to write beyond the top of the posted write buffer are ignored. The value of the posted write buffer pointer can be cleared at reset, or by software using a write under the control of a primary processing set.

Returning to FIG. 12, after saving the status and posted writes, at Stage S4 the individual processing sets independently seek to evaluate the error state and to determine whether one of the processing sets is faulty. This determination is made by the individual processors in an error state in which they individually read status from the control state and EState registers 114. During this error mode, the arbiter 134 arbitrates for access to the bridge 12.

In Stage S5, one of the processing sets 14 and 16 establishes itself as the primary processing set. This is determined by each of the processing sets identifying a time factor based on the estimated degree of responsibility for the error, whereby the first processing set to time out becomes the primary processing set. In Stage S5, the status is recovered for that processing set and is copied to the other processing set. The primary processing is able to access the posted write buffer 122 and the disconnect registers 120.

In Stage S6, the bridge is operable in a split mode. If it is possible to re-establish an equivalent status for the first and second processing sets, then a reset is issued at Stage S7 to put the processing sets in the combined mode at Stage S1. However, it may not be possible to re-establish an equivalent state until a faulty processing set is replaced. Accordingly the system will stay in the Split mode of Stage S6 in order to continued operation based on a single processing set.

After replacing the faulty processing set the system could then establish an equivalent state and move via Stage S7 to Stage S1.

As described above, the comparator 130 is operable in the combined mode to compare the I/O operations output by the first and second processing sets 14 and 16. This is fine as long as all of the I/O operations of the first and second processing sets 14 and 16 are fully synchronized and deterministic. Any deviation from this will be interpreted by the comparator 130 as a loss of lockstep. This is in principle correct as even a minor deviation from identical outputs, if not trapped by the comparator 130, could lead to the processing sets diverging further from each other as the individual processing sets act on the deviating outputs. However, a strict application of this puts significant constraints on the design of the individual processing sets. An example of this is that it would not be possible to have independent time of day clocks in the individual processing sets operating under their own clocks. This is because it is impossible to obtain two crystals which are 100% identical in operation. Even small differences in the phase of the clocks could be critical as to whether the same sample is taken at any one time, for example either side of a clock transition for the respective processing sets.

Accordingly, a solution to this problem employs the dissimilar data registers (DDR) 116 mentioned earlier. The solution is to write data from the processing sets into respective DDRs in the bridge while disabling the comparison of the data phases of the write operations and then to read a selected one of the DDRs back to each processing set, whereby each of the processing sets is able to act on the same data.

Figure 17:
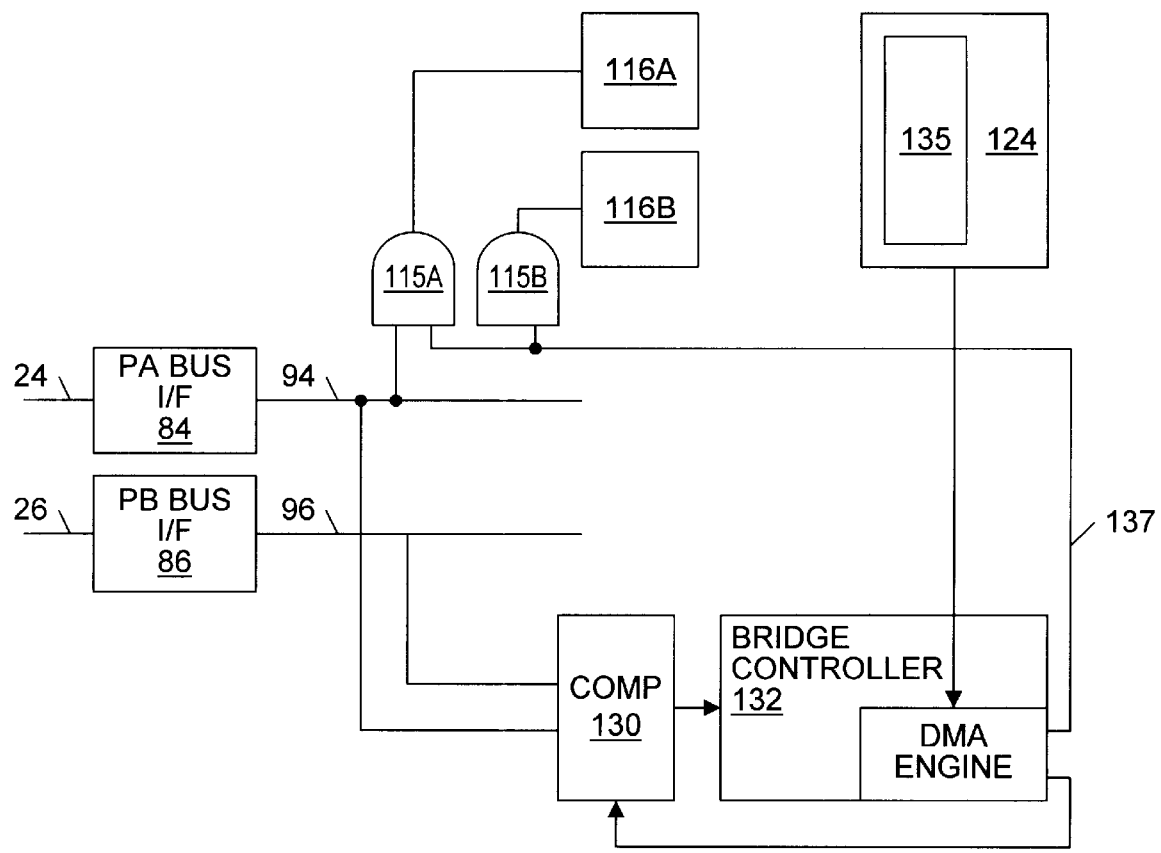
FIG. 17 illustrates a dissimilar data write stage.

FIG. 17 is a schematic representation of details of the bridge of FIGS. 6 to 10. It will be noted that details of the bridge not shown in FIGS. 6 to 8 are shown in FIG. 17, whereas other details of the bridge shown in FIGS. 6 to 8 are not shown in FIG. 17, for reasons of clarity.

The DDRs 116 are provided in the bridge registers 110 of FIG. 7, but could be provided elsewhere in the bridge in other embodiments. One DDR 116 is provided for each processing set. In the example of the multi-processor system of FIG. 1 where two processing sets 14 and 16 are provided, two DDRs 116A and 116B are provided, one for each of the first and second processing sets 14 and 16, respectively.

FIG. 17 represents a dissimilar data write stage. The addressing logic 136 is shown schematically to comprise two decoder sections, one decoder section 136A for the first processing set and one decoder section 136B for the second processing set 16. During an address phase of a dissimilar data I/O write operation each of the processing sets 14 and 16 outputs the same predetermined address DDR-W which is separately interpreted by the respective first and second decoding sections 136A and 136B as addressing the respective first and second respective DDRs 116A and 116B. As the same address is output by the first and second processing sets 14 and 16, this is not interpreted by the comparator 130 as a lockstep error.

The decoding section 136A, or the decoding section 136B, or both are arranged to further output a disable signal 137 in response to the predetermined write address supplied by the first and second processing sets 14 and 16. This disable signal is supplied to the comparator 130 and is operative during the data phase of the write operation to disable the comparator. As a result, the data output by the first processing set can be stored in the first DDR 116A and the data output by the second processing set can be stored in the second DDR 116B without the comparator being operative to detect a difference, even if the data from the first and second processing sets is different. The first decoding section is operable to cause the routing matrix to store the data from the first processing set 14 in the first DDR 116A and the second decoding section is operable to cause the routing matrix to store the data from the second processing set 16 in the second DDR 116B. At the end of the data phase the comparator 130 is once again enabled to detect any differences between I/O address and/or data phases as indicative of a lockstep error.

Following the writing of the dissimilar data to the first and second DDRs 116A and 116B, the processing sets are then operable to read the data from a selected one of the DDRs 116A/116B.

Figure 18:
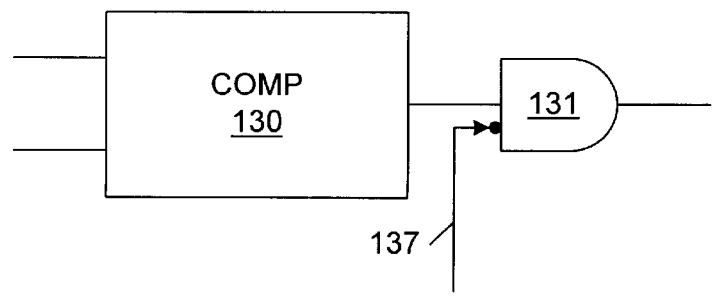
FIG. 18 illustrates a modification to FIG. 17.

FIG. 18 illustrates an alternative arrangement where the disable signal 137 is negated and is used to control a gate 131 at the output of the comparator 130. When the disable signal is active the output of the comparator is disabled, whereas when the disable signal is inactive the output of the comparator is enabled.

Figure 19:
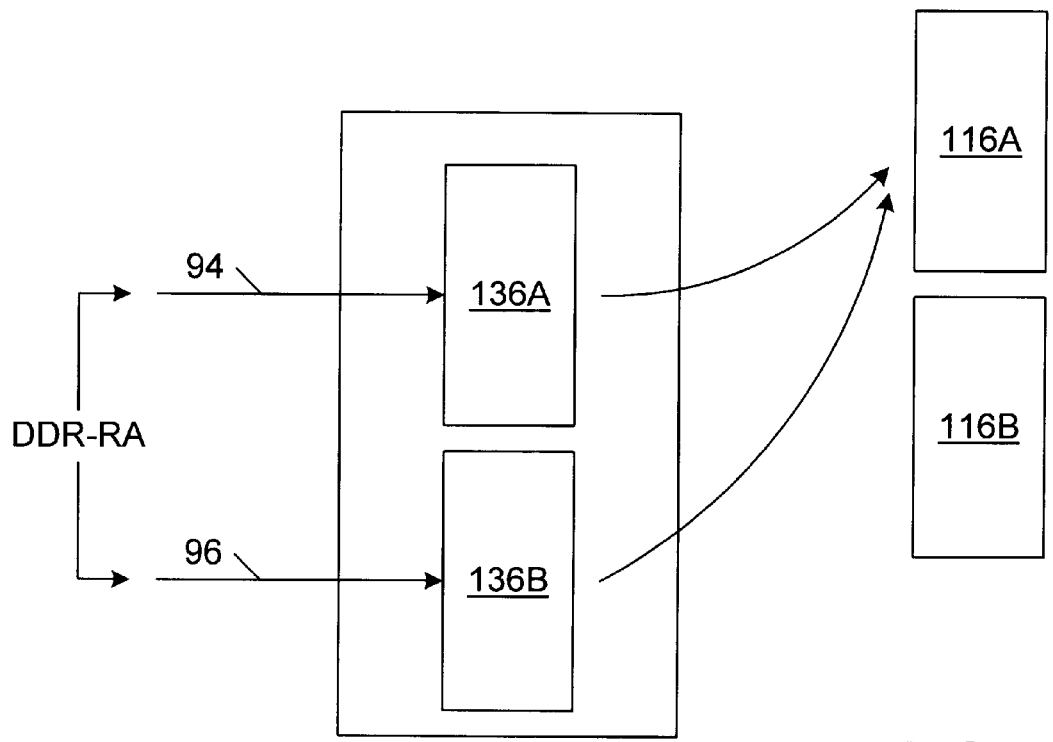
FIG. 19 illustrates a dissimilar data read stage.

FIG. 19 illustrates the reading of the first DDR 116A in a subsequent dissimilar data read stage. As illustrated in FIG. 19, each of the processing sets 14 and 16 outputs the same predetermined address DDR-RA which is separately interpreted by the respective first and second decoding sections 136A and 136B as addressing the same DDR, namely the first DDR 116A. As a result, the content of the first DDR 116A is read by both of the processing sets 14 and 16, thereby enabling those processing sets to receive the same data. This enables the two processing sets 14 and 16 to achieve deterministic behavior, even if the source of the data written into the DDRs 116 by the processing sets 14 and 16 was not deterministic.

Figure 20:
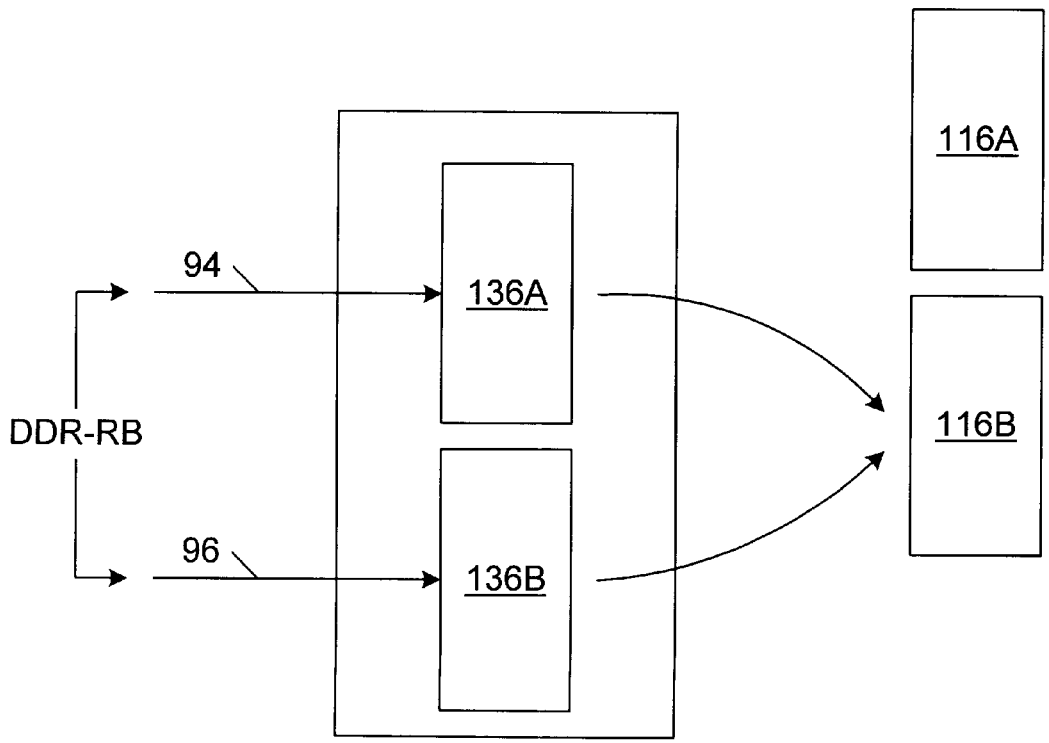
FIG. 20 illustrates an alternative dissimilar data read stage.

As an alternative, the processing sets could each read the data from the second DDR 116B. FIG. 20 illustrates the reading of the second DDR 116B in a dissimilar data read stage following the dissimilar data write stage of FIG. 15. As illustrated in FIG. 20, each of the processing sets 14 and 16 outputs the same predetermined address DDR-RB which is separately interpreted by the respective first and second decoding sections 136A and 136B as addressing the same DDR, namely the second DDR 116B. As a result, the content of the second DDR 116B is read by both of the processing sets 14 and 16, thereby enabling those processing sets to receive the same data. As with the dissimilar data read stage of FIG. 16, this enables the two processing sets 14 and 16 to achieve deterministic behavior, even if the source of the data written into the DDRs 116 by the processing sets 14 and 16 was not deterministic.

The selection of which of the first and second DDRs 116A and 116B to be read can be determined in any appropriate manner by the software operating on the processing modules. This could be done on the basis of a simple selection of one or the other DDRs, or on a statistical basis or randomly or in any other manner as long as the same choice of DDR is made by both or all of the processing sets.

Figure 21:
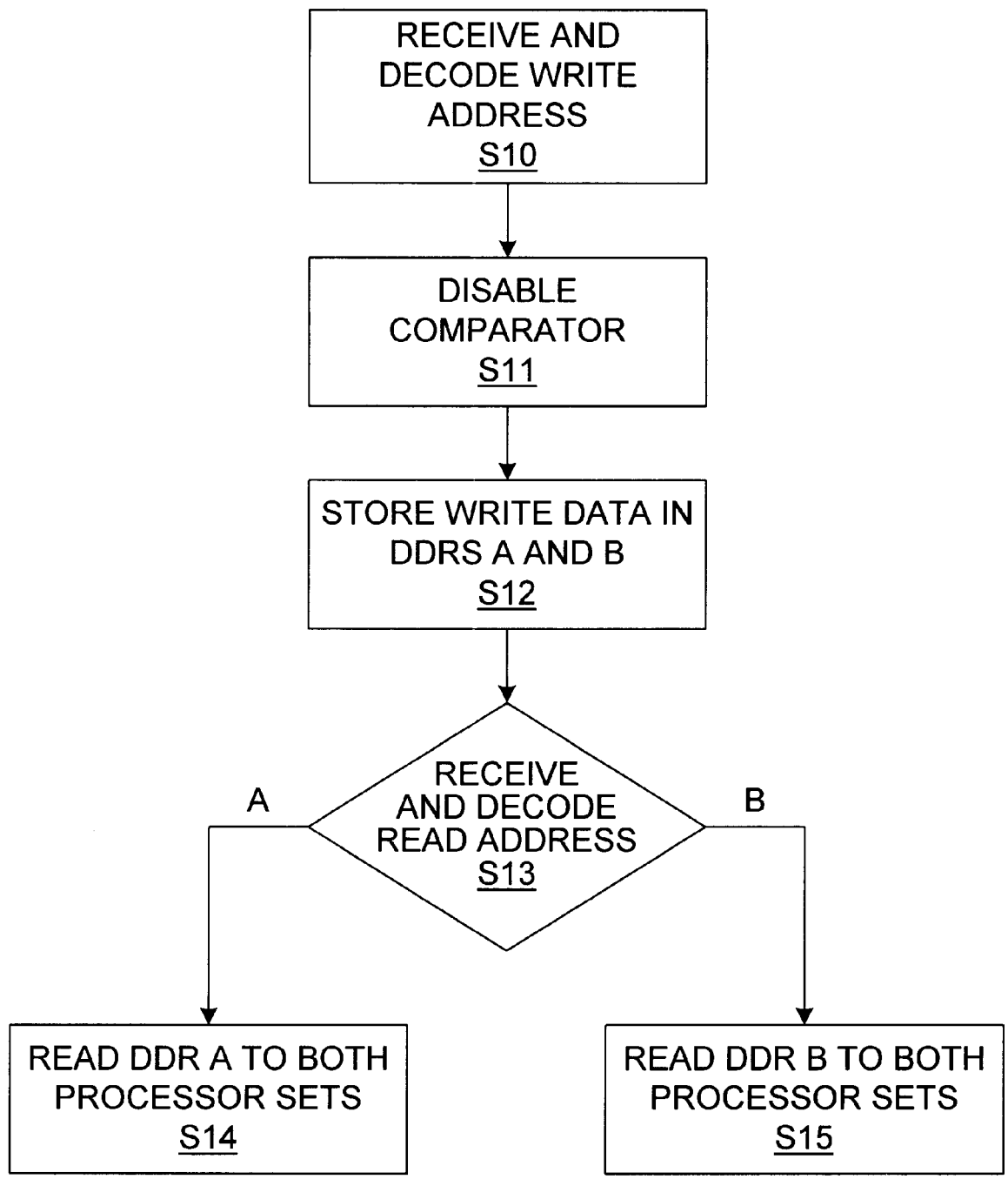
FIG. 21 is a flow diagram summarising the operation of a dissimilar data write mechanism.

FIG. 21 is a flow diagram summarizing the various stages of operation of the DDR mechanism described above.

In stage S10, a DDR write address DDR-W is received and decoded by the address decoders sections 136A and 136B during the address phase of the DDR write operation.

In stage S11, the comparator 130 is disabled.

In stage S12, the data received from the processing sets 14 and 16 during the data phase of the DDR write operation is stored in the first and second DDRs 116A and 116B, respectively, as selected by the first and second decode sections 136A and 136B, respectively.

In stage S13, a DDR read address is received from the first and second processing sets and is decoded by the decode sections 136A and 136B, respectively.

If the received address DDR-RA is for the first DDR 116A, then in stage S14 the content of that DDR 116A is read by both of the processing sets 14 and 16.

Alternatively, 116A if the received address DDR-RB is for the second DDR 116B, then in stage S15 the content of that DDR 116B is read by both of the processing sets 14 and 16.

Figure 22:
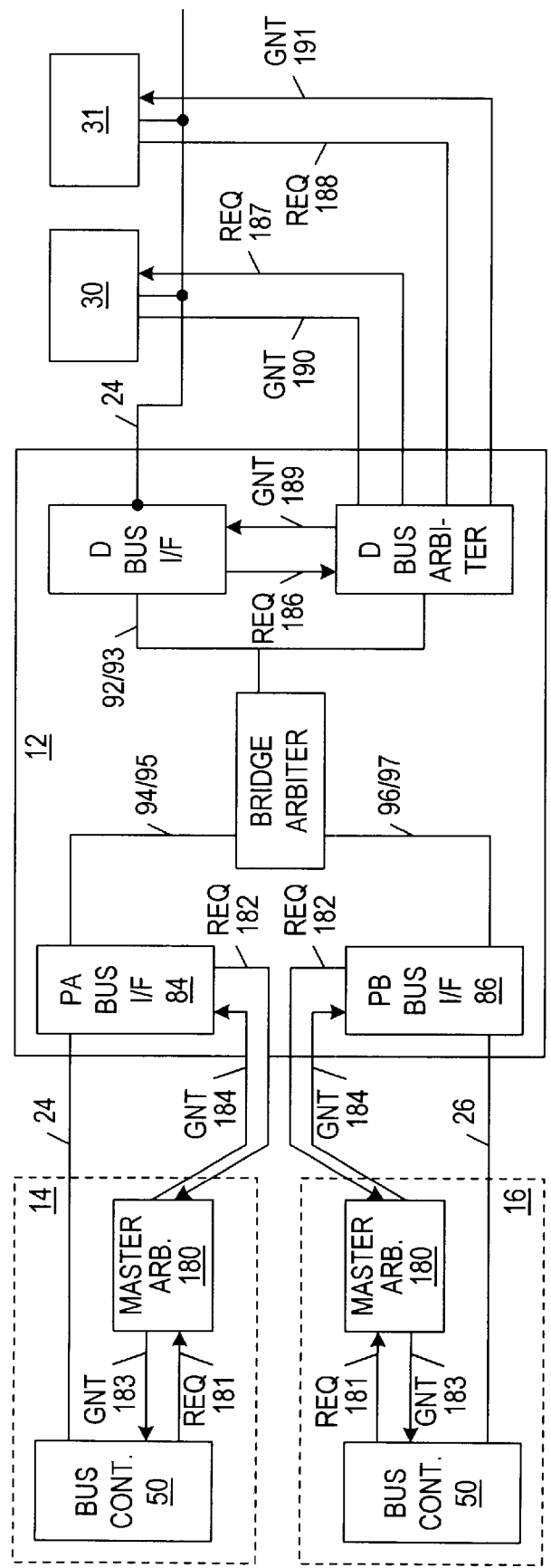
FIG. 22 is a schematic block diagram explaining arbitration within the system of FIG. 1.

FIG. 22 is a schematic representation of the arbitration performed on the respective buses 22, 24 and 26, and the arbitration for the bridge itself.

Each of the processing set bus controllers 50 in the respective processing sets 14 and 16 includes a conventional PCI master bus arbiter 180 for providing arbitration to the respective buses 24 and 26. Each of the master arbiters 180 is responsive to request signals from the associated processing set bus controller 50 and the bridge 12 on respective request (REQ) lines 181 and 182. The master arbiters 180 allocate access to the bus on a first-come-first-served basis, issuing a grant (GNT) signal to the winning party on an appropriate grants line 183 or 184.

A conventional PCI bus arbiter 185 provides arbitration on the D bus 22. The D bus arbiter 185 can be configured as part of the D bus interface 82 of FIG. 6 or could be separate therefrom. As with the P bus master arbiters 180, the D bus arbiter is responsive to request signals from the contending devices, including the bridge and the devices 30, 31, etc. connected to the device bus 22. Respective request lines 186, 187, 188, etc. for each of the entities competing for access to the D bus 22 are provided for the request signals (REQ). The D bus arbiter 185 allocates access to the D bus on a first-come-first-served basis, issuing a grant (GNT) signal to the winning entity via respective grant lines 189, 190, 192, etc.

Figure 23:
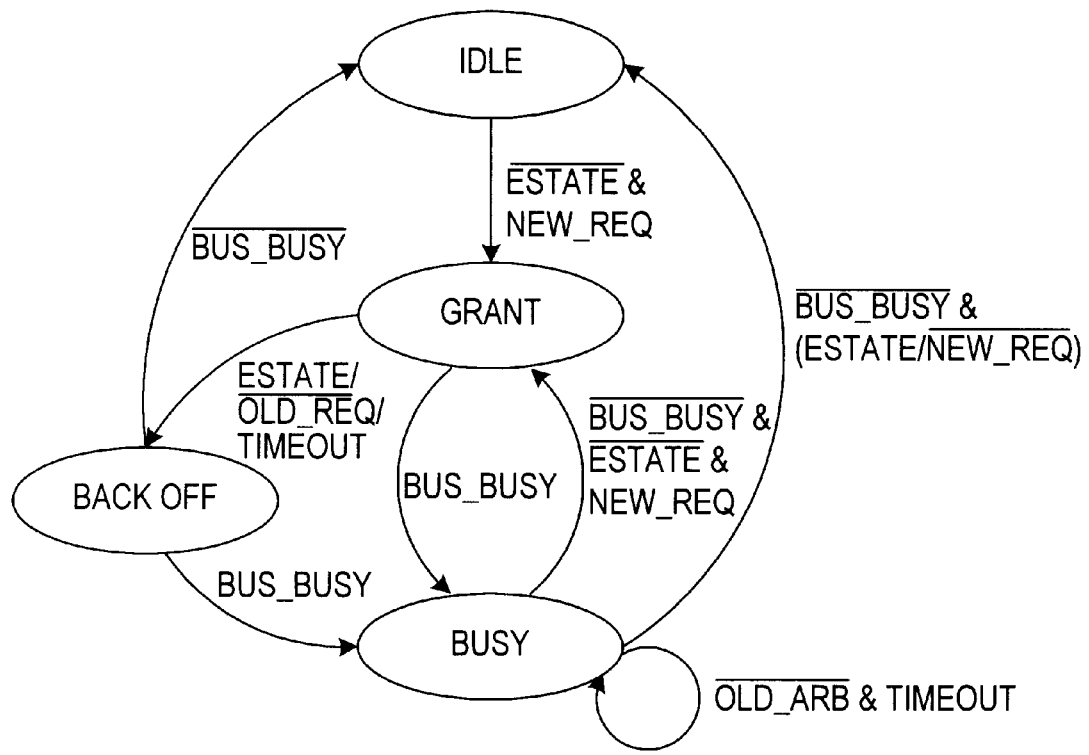
FIG. 23 is a state diagram illustrating the operation of a device bus arbiter.

FIG. 23 is a state diagram summarising the operation of the D bus arbiter 185. In a particular embodiment up to six request signals may be produced by respective D bus devices and one by the bridge itself. On a transition into the GRANT state, these are sorted by a priority encoder and a request signal (REQ#) with the highest priority is registered as the winner and gets a grant (GNT#) signal. Each winner which is selected modifies the priorities in a priority encoder so that given the same REQ# signals on the next move to grant. A different device has the highest priority, hence each device has a "fair" chance of accessing DEVs. The bridge REQ# has a higher weighting than D bus devices and will, under very busy conditions, get the bus for every second device.

If a device requesting the bus fails to perform a transaction within 16 cycles it may lose GNT# via the BACKOFF state. BACKOFF is required as, under PCI rules, a device may access the bus one cycle after GNT# is removed. Devices may only be granted access to D bus if the bridge is not in the not in the EState. A new GNT# is produced at the times when the bus is idle.

In the GRANT and BUSY states, the FETs are enabled and an accessing device is known and forwarded to the D bus address decode logic for checking against a DMA address provided by the device.

Figure 24:
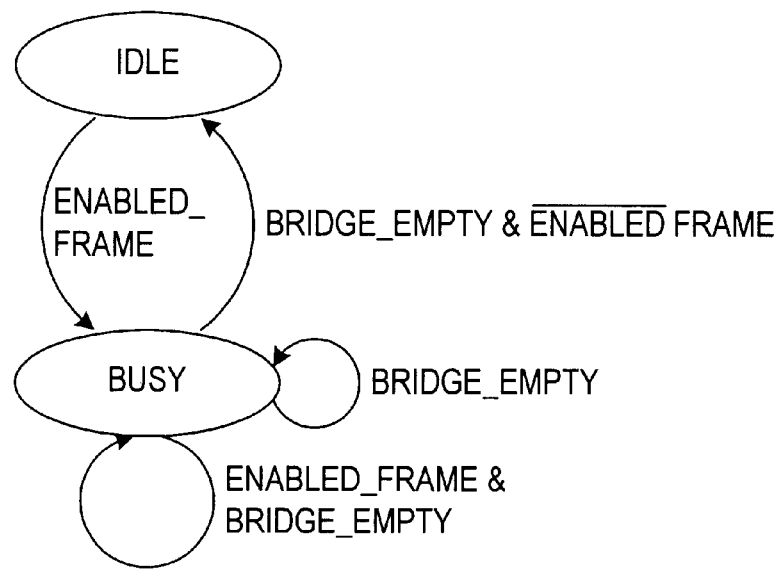
FIG. 24 is a state diagram illustrating the operation of a bridge arbiter.

Turning now to the bridge arbiter 134, this allows access to the bridge for the first device which asserts the PCI FRAME# signal indicating an address phase. FIG. 24 is a state diagram summarising the operation of the bridge arbiter 134.

As with the D bus arbiter, a priority encoder can be provided to resolve access attempts which collide. In this case "a collision" the loser/losers are retried which forces them to give up the bus. Under PCI rules retried devices must try repeatedly to access the bridge and this can be expected to happen.

To prevent devices which are very quick with their retry attempt from hogging the bridge, retried interfaces are remembered and assigned a higher priority. These remembered retries are prioritised in the same way as address phases. However as a precaution this mechanism is timed out so as not to get stuck waiting for a faulty or dead device. The algorithm employed prevents a device which hasn't yet been retried, but which would be a higher priority retry than a device currently waiting for, from being retried at the first attempt.

In combined operations a PA or PB bus input selects which P bus interface will win a bridge access. Both are informed they won. Allowed selection enables latent fault checking during normal operation. EState prevents the D bus from winning.

The bridge arbiter 134 is responsive to standard PCI signals provided on standard PCI control lines 22, 24 and 25 to control access to the bridge 12.

Figure 25:
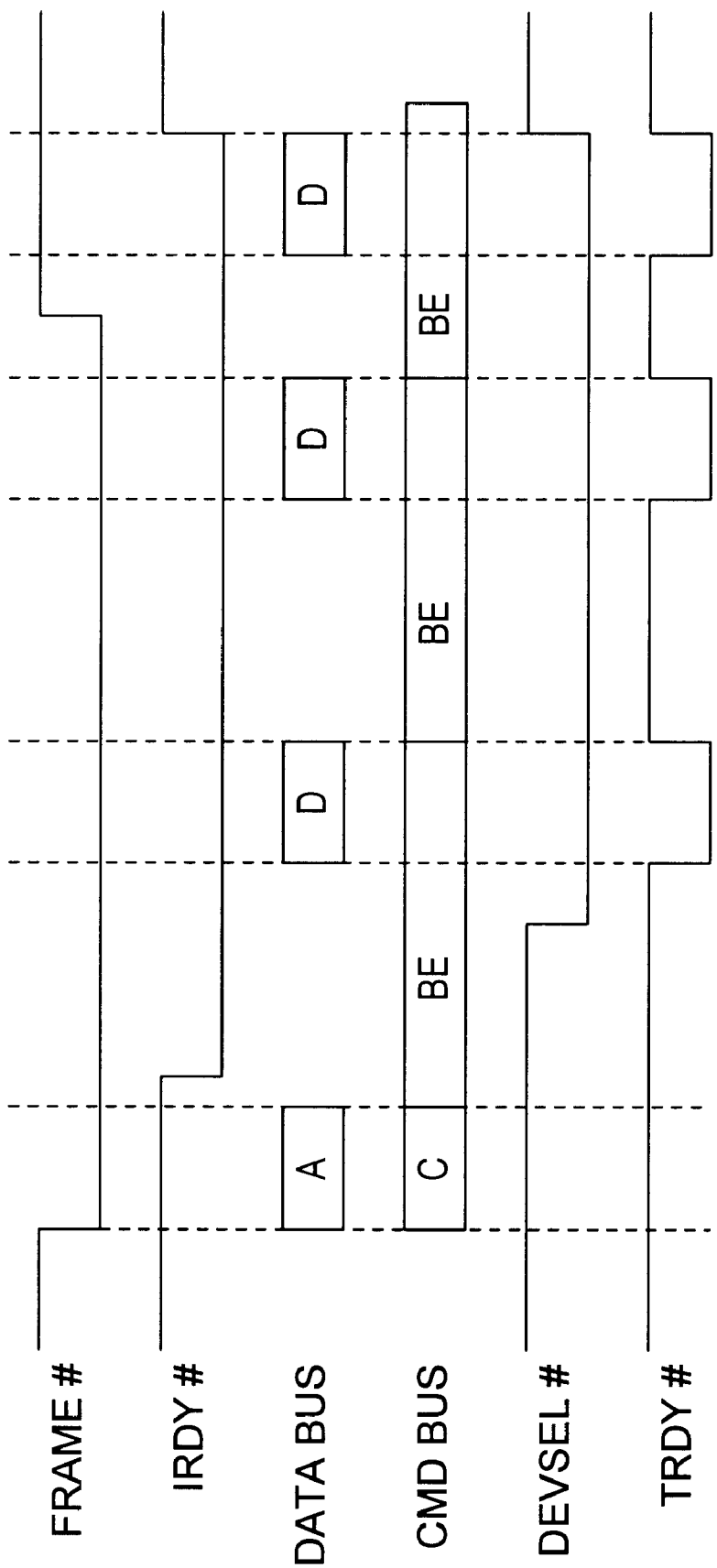
FIG. 25 is a timing diagram for PCI signals.

FIG. 25 illustrates signals associated with an I/O operation cycle on the PCI bus. A PCI frame signal (FRAME#) is initially asserted. At the same time, address (A) signals will be available on the DATA BUS and the appropriate command (write/read) signals (C) will be available on the command bus (CMD BUS). Shortly after the frame signal being asserted low, the initiator ready signal (IRDY#) will also be asserted low. When the device responds, a device selected signal (DEVSEL#) will be asserted low. When a target ready signal is asserted low (TRDY#), data transfer (D) can occur on the data bus.

The bridge is operable to allocate access to the bridge resources and thereby to negotiate allocation of a target bus in response to the FRAME# being asserted low for the initiator bus concerned. Accordingly, the bridge arbiter 134 is operable to allocate access to the bridge resources and/or to a target bus on a first-come-first-served basis in response to the FRAME# being asserted low. As well as the simple first-come-first-served basis, the arbiters may be additionally provided with a mechanism for logging the arbitration requests, and can imply a conflict resolution based on the request and allocation history where two requests are received at an identical time. Alternatively, a simple priority can be allocated to the various requesters, whereby, in the case of identically timed requests, a particular requester always wins the allocation process.

Each of the slots on the device bus 22 has a slot response register (SRR) 118, as well as other devices connected to the bus, such as a SCSI interface. Each of the SRRs 118 contains bits defining the ownership of the slots, or the devices connected to the slots on the direct memory access bus. In this embodiment, and for reasons to be elaborated below, each SRR 118 comprises a four bit register. However, it will be appreciated that a larger register will be required to determine ownership between more than two processing sets. For example, if three processing sets are provided, then a five bit register will be required for each slot.

Figure 16:
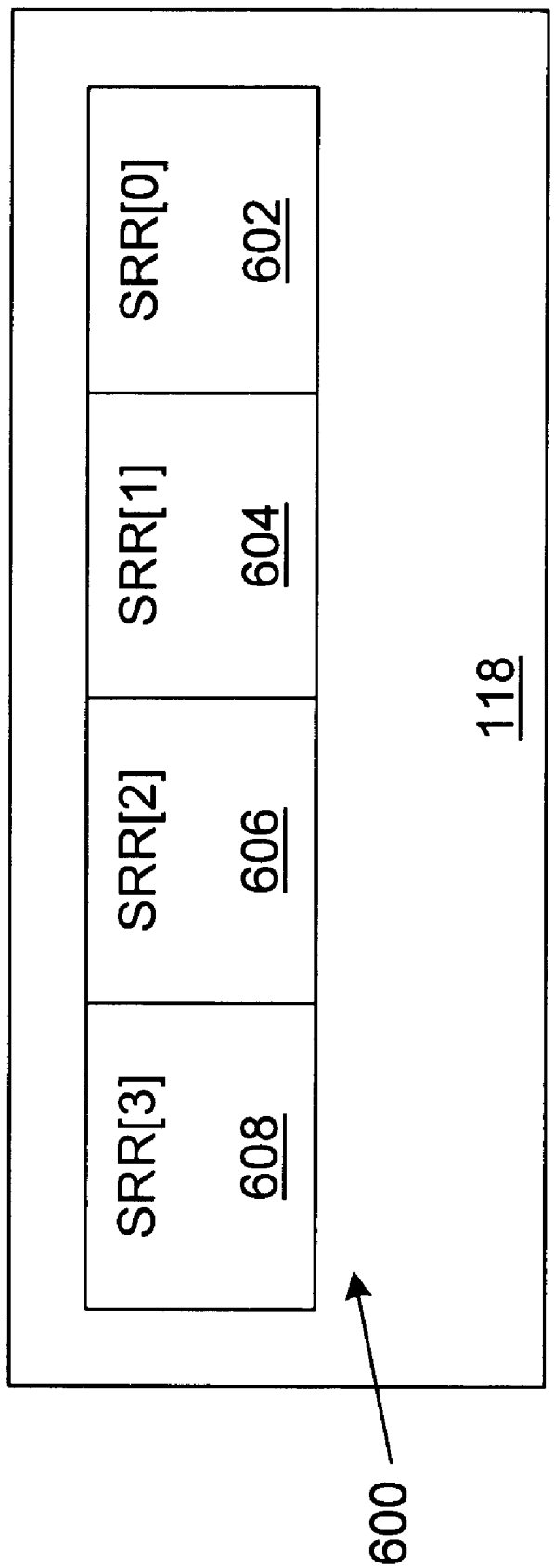
FIG. 16 is a schematic representation of a slot response register.

FIG. 16 illustrates schematically one such four bit register 600. As shown in FIG. 16, a first bit 602 is identified as SRR[0], a second bit 604 is identified as SRR[1], a third bit 606 is identified as SRR[2] and a fourth bit 608 is identified as SRR[3].

Bit SRR[0] is a bit which is set when writes for valid transactions are to be suppressed.

Bit SRR[1] is set when the device slot is owned by the first processing set 14. This defines the access route between the first processing set 14 and the device slot. When this bit is set, the first processing set 14 can always be master of a device slot 22, while the ability for the device slot to be master depends on whether bit SRR[3] is set.

Bit SRR[2] is set when the device slot is owned by the second processing set 16. This defines the access route between the second processing set 16 and the device slot. When this bit is set, the second processing set 16 can always be master of the device slot or bus 22, while the ability for the device slot to be master depends on whether bit SRR[3] is set.

Bit SRR[3] is an arbitration bit which gives the device slot the ability to become master of the device bus 22, but only if it is owned by one of the processing sets 14 and 16, that is if one of the SRR [1] and SRR[2] bits is set.

When the fake bit (SRR[0]) of an SRR 118 is set, writes to the device for that slot are ignored and do not appear on the device bus 22. Reads return indeterminate data without causing a transaction on the device bus 22. In the event of an I/O error the fake bit SRR[0] of the SRR 188 corresponding to the device which caused the error is set by the hardware configuration of the bridge to disable further access to the device slot concerned. An interrupt may also be generated by the bridge to inform the software which originated the access leading to the I/O error that the error has occurred. The fake bit has an effect whether the system is in the split or the combined mode of operation.

The ownership bits only have effect, however, in the split system mode of operation. In this mode, each slot can be in three states:

Not-owned;

Owned by processing set 14; and

Owned by processing set 16

This is determined by the two SRR bits SRR[1] and SRR[2], with SRR[1] being set when the slot is owned by processing set 14 and SRR[2] being set when the slot is owned by processing set B. If the slot is un-owned, then neither bit is set (both bits set is an illegal condition and is prevented by the hardware).

A slot which is not owned by the processing set making the access (this includes un-owned slots) cannot be accessed and results in an abort. A processing set can only claim an un-owned slot; it cannot wrest ownership away from another processing set. This can only be done by powering-off the other processing set. When a processing set is powered off, all slots owned by it move to the un-owned state. Whilst it is not possible for a processing set to wrest ownership from another processing set, it is possible for a processing set to give ownership to another processing set.

The owned bits can be altered when in the combined mode of operation state but they have no effect until the split mode is entered.

Table 2 below summarizes the access rights as determined by an SRR 118.

From Table 2, it can be seen that when the 4-bit SRR for a given device is set to 1100, for example, then the slot is owned by processing set B (i.e. SRR[2] is logic high) and processing set A may not read from or write to the device (i.e. SRR[1] is logic low), although it may read from or write to the bridge. "FAKE_AT" is set logic low (i.e. SRR[0] is logic low) indicating that access to the device bus is allowed as there are no faults on the bus. As "ARB_EN" is set logic high (i.e. SRR[3] is logic high), the device with which the register is associated can become master of the D bus. This example demonstrates the operation of the register when the bus and associated devices are operating correctly.

TABLE 2

| SRR [3][2][1][0] | PA BUS | PB BUS | Device Interface |
|---|---|---|---|
| 0000 x00x | Read/Write bridge SRR | Read/Write bridge SRR | Access denied |
| 0010 | Read/Write bridge Owned D Slot | Read/Write bridge No access to D Slot | Access Denied because arbitration bit is off |
| 0100 | Read/Write bridge No access to D Slot | Read/write bridge Access to D Slot | Access Denied because arbitration bit is off |
| 1010 | Read/Write bridge, Owned D Slot | Read/Write Bridge No access to D Slot | Access to CPU B Denied Access to CPU A OK |
| 1100 | Read/Write bridge, No access to D Slot | Read/Write bridge Access to D Slot | Access to CPU A Denied Access to CPU B OK |
| 0011 | Read/Write bridge, Bridge discard writes | Read/Write bridge No access to D Slot | Access Denied because Arbitration bit is off |
| 0101 | Read/Write bridge, No access to D slot | Read/Write bridge Bridge discards writes | Access Denied because Arbitration bit is off |
| 1011 | Read/Write bridge, Bridge discard writes | Read/Write bridge No access to D Slot | Access to CPU B Denied Access to CPU A OK |
| 1101 | Read/Write bridge, No access to D slot | Read/Write bridge Bridge discards writes | Access to CPU B Denied Access to CPU A OK |

In an alternative example, where the SRR for the device is set to 0101, the setting of SRR[2] logic high indicates that the device is owned by processing set B. However, as the device is malfunctioning, SRR[3] is set logic low and the device is not allowed access to the processing set. SRR[0] is set high so that any writes to the device are ignored and reads therefrom return indeterminate data. In this way, the malfunctioning device is effectively isolated from the processing set, and provides indeterminate data to satisfy any device drivers, for example, that might be looking for a response from the device.

Figure 26:
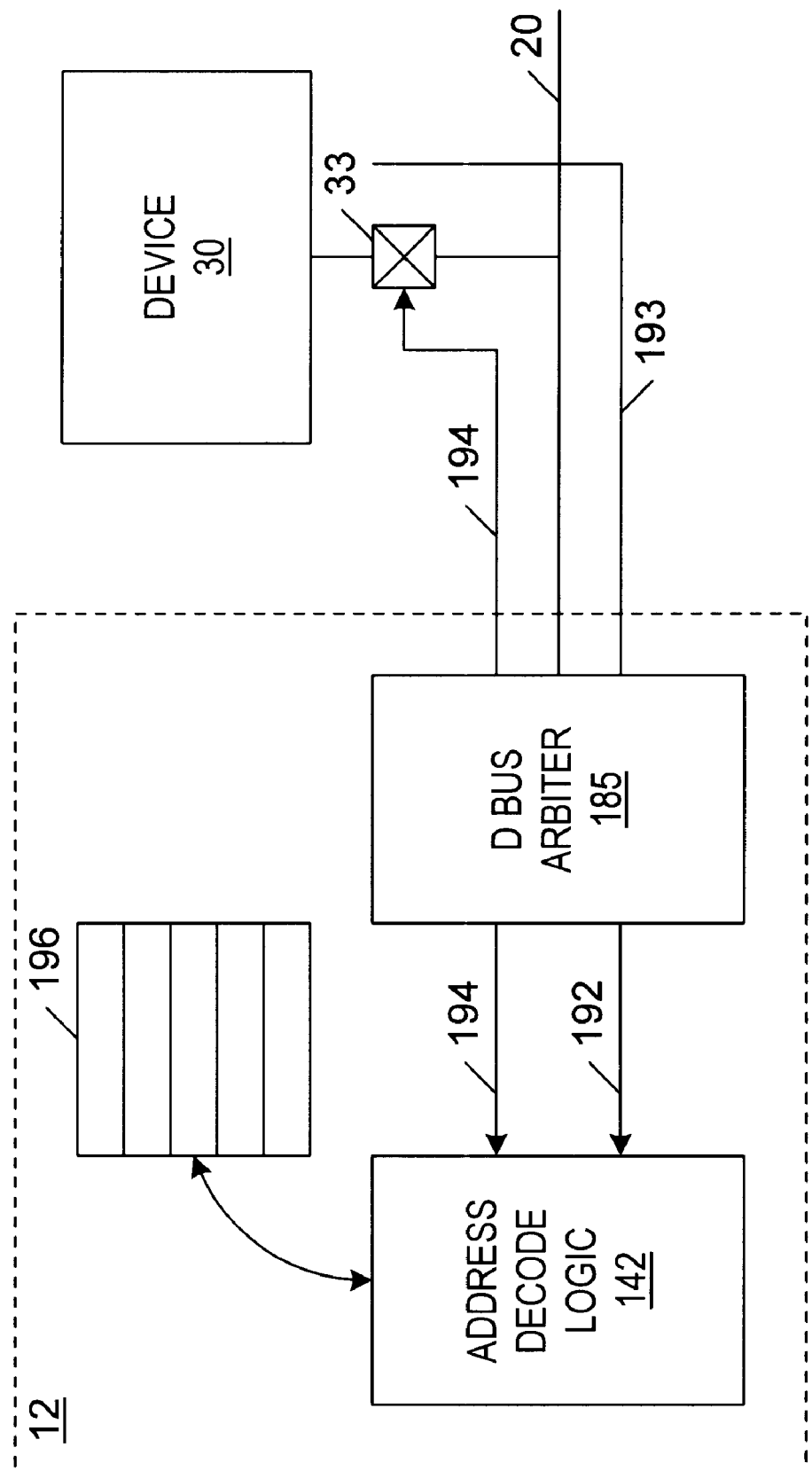
FIG. 26 is a schematic diagram illustrating the operation of the bridge of FIG. 6 for direct memory access.

FIG. 26 illustrates the operation of the bridge 12 for direct memory access by a device such as one of the devices 28, 29, 30, 31 and 32 to the memory 56 of the processing sets 14 and 16. When the D bus arbiter 185 receives a direct memory access (DMA) request 193 from a device (e.g., device 30 in slot 33) on the device bus, the D bus arbiter determines whether to allocate the bus to that slot. As a result of this granting procedure, the D-bus arbiter knows the slot which has made the DMA request 193. The DMA request is supplied to the address decoder 142 in the bridge, where the addresses associated with the request are decoded. The address decoder is responsive to the D bus grant signal 194 for the slot concerned to identify the slot which has been granted access to the D bus for the DMA request.

The address decode logic 142 holds or has access to a geographic address map 196, which identifies the relationship between the processor address space and the slots as a result of the geographic address employed. This geographic address map 196 could be held as a table in the bridge memory 126, along with the posted write buffer 122 and the dirty RAM 124. Alternatively, it could be held as a table in a separate memory element, possibly forming part of the address decoder 142 itself. The map 182 could be configured in a form other than a table.

The address decode logic 142 is configured to verify the correctness of the DMA addresses supplied by the device 30. In one embodiment of the invention, this is achieved by comparing four significant address bits of the address supplied by the device 30 with the corresponding four address bits of the address held in the geographic addressing map 196 for the slot identified by the D bus grant signal for the DMA request. In this example, four address bits are sufficient to determine whether the address supplied is within the correct address range. In this specific example, 32 bit PCI bus addresses are used, with bits 31 and 30 always being set to 1, bit 29 being allocated to identify which of two bridges on a motherboard is being addressed (see FIG. 2) and bits 28 to 26 identifying a PCI device. Bits 25-0 define an offset from the base address for the address range for each slot. Accordingly, by comparing bits 29-26, it is possible to identify whether the address(es) supplied fall(s) within the appropriate address range for the slot concerned. It will be appreciated that in other embodiments a different number of bits may need to be compared to make this determination depending upon the allocation of the addresses.

The address decode logic 142 could be arranged to use the bus grant signal 184 for the slot concerned to identify a table entry for the slot concerned and then to compare the address in that entry with the address(es) received with the DMA request as described above. Alternatively, the address decode logic 142 could be arranged to use the address(es) received with the DMA address to address a relational geographic address map and to determine a slot number therefrom, which could be compared to the slot for which the bus grant signal 194 is intended and thereby to determine whether the addresses fall within the address range appropriate for the slot concerned.

Either way, the address decode logic 142 is arranged to permit DMA to proceed if the DMA addresses fall within the expected address space for the slot concerned. Otherwise, the address decoder is arranged to ignore the slots and the physical addresses.

The address decode logic 142 is further operable to control the routing of the DMA request to the appropriate processing set(s) 14/16. If the bridge is in the combined mode, the DMA access will automatically be allocated to all of the in-sync processing sets 14/16. The address decode logic 142 will be aware that the bridge is in the combined mode as it is under the control of the bridge controller 132 (see FIG. 8). However, where the bridge is in the split mode, a decision will need to be made as to which, if any, of the processing sets the DMA request is to be sent.

When the system is in split mode, the access will be directed to a processing set 14 or 16 which owns the slot concerned. If the slot is un-owned, then the bridge does not respond to the DMA request. In the split mode, the address decode logic 142 is operable to determine the ownership of the device originating the DMA request by accessing the SRR 118 for the slot concerned. The appropriate slot can be identified by the D bus grant signal. The address decode logic 142 is operable to control the target controller 140 (see FIG. 8) to pass the DMA request to the appropriate processing set(s) 14/16 based on the ownership bits SRR[1] and SRR[2]. If bit SRR[1] is set, the first processing set 14 is the owner and the DMA request is passed to the first processing set. If bit SRR[2] is set, the second processing set 16 is the owner and the DMA request is passed to the second processing set. If neither of the bit SRR[1] and SRR[2] is set, then the DMA request is ignored by the address decoder and is not passed to either of the processing sets 14 and 16.

Figure 27:
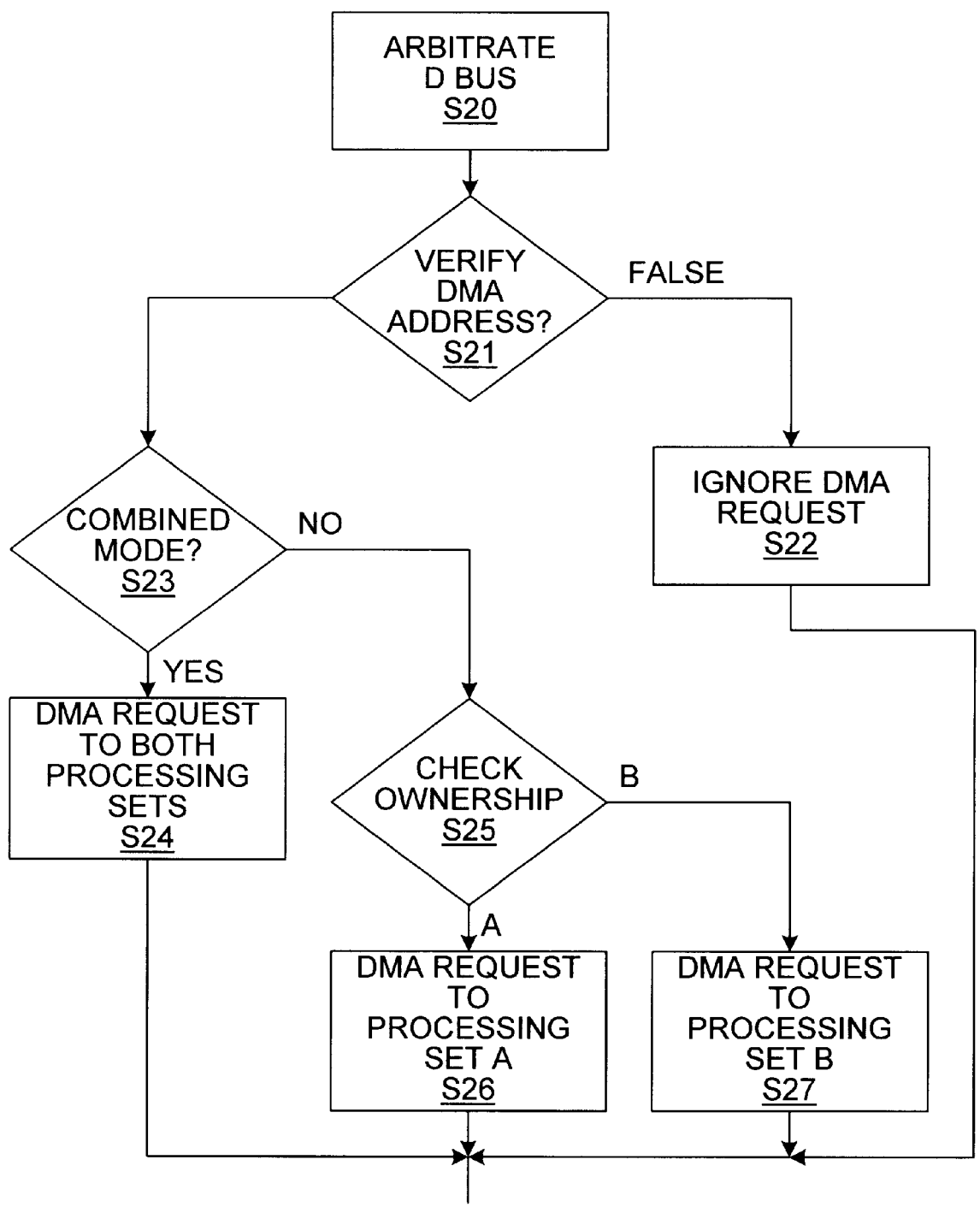
FIG. 27 is a flow diagram illustrating a direct memory access method in the bridge of FIG. 6.

FIG. 27 is a flow diagram summarizing the DMA verification process as illustrated with reference to FIG. 24.

In stage S20, the D-bus arbiter 160 arbitrates for access to the D bus 22.

In stage S21, the address decoder 142 verifies the DMA addresses supplied with the DMA request by accessing the geographic address map.

In stage S22, the address decoder ignores the DMA access where the address falls outside the expected range for the slot concerned.

Alternatively, as represented by stage S23, the actions of the address decoder are dependent upon whether the bridge is in the combined or the split mode.

If the bridge is in the combined mode, then in stage S24 the address decoder controls the target controller 140 (see FIG. 8) to cause the routing matrix 80 (see FIG. 6) to pass the DMA request to both processing sets 14 and 16.

If the bridge is in the split mode, the address decoder is operative to verify the ownership of the slot concerned by reference to the SRR 118 for that slot in stage S25.

If the slot is allocated to the first processing set 14 (i.e. the SRR[1] bit is set), then in stage S26 the address decoder 142 controls the target controller 140 (see FIG. 8) to cause the routing matrix 80 (see FIG. 6) to pass the DMA request to first processing set 14.

If the slot is allocated to the second processing set 16 (i.e. the SRR[2] bit is set), then in stage S27 the address decoder 142 controls the target controller 140 (see FIG. 8) to cause the routing matrix 80 (see FIG. 6) to pass the DMA request to the second processing set 16.

If the slot is unallocated (i.e. neither the SRR[1] bit nor the SRR[2] bit is set), then in step S18 the address decoder 142 ignores or discards the DMA request and the DMA request is not passed to the processing sets 14 and 16.

A DMA, or direct vector memory access (DVMA), request sent to one or more of the processing sets causes the necessary memory operations (read or write as appropriate) to be effected on the processing set memory.

There now follows a description of an example of a mechanism for enabling automatic recovery from an EState (see FIG. 11).

The automatic recovery process includes reintegration of the state of the processing sets to a common status in order to attempt a restart in lockstep. To achieve this, the processing set which asserts itself as the primary processing set as described above copies its complete state to the other processing set. This involves ensuring that the content of the memory of both processors is the same before trying a restart in lockstep mode.

However, a problem with the copying of the content of the memory from one processing set to the other is that during this copying process a device connected to the D bus 22 might attempt to make a direct memory access (DMA) request for access to the memory of the primary processing set. If DMA is enabled, then a write made to an area of memory which has already been copied would result in the memory state of the two processors at the end of the copy not being the same. In principle, it would be possible to inhibit DMA for the whole of the copy process. However, this would be undesirable, bearing in mind that it is desirable to minimise the time that the system or the resources of the system are unavailable. As an alternative, it would be possible to retry the whole copy operation when a DMA operation has occurred during the period of the copy. However, it is likely that further DMA operations would be performed during the copy retry, and accordingly this is not a good option either. Accordingly, in the present system, a dirty RAM 124 is provided in the bridge. As described earlier the dirty RAM 124 is configured as part of the bridge SRAM memory 126.

The dirty RAM 124 comprises a bit map having a dirty indicator, for example a dirty bit, for each block, or page, of memory. The bit for a page of memory is set when a write access to the area of memory concerned is made. In an embodiment of the invention one bit is provided for every 8K page of main processing set memory. The bit for a page of processing set memory is set automatically by the address decoder 142 when this decodes a DMA request for that page of memory for either of the processing sets 14 or 16 from a device connected to the D bus 22. The dirty RAM can be reset, or cleared when it is read by a processing set, for example by means of read and clear instructions at the beginning of a copy pass, so that it can start to record pages which are dirtied since a given time.

The dirty RAM 124 can be read word by word. If a large word size is chosen for reading the dirty RAM 124, this will optimise the reading and resetting of the dirty RAM 124.

Accordingly, at the end of the copy pass the bits in the dirty RAM 124 will indicate those pages of processing set memory which have been changed (or dirtied) by DMA writes during the period of the copy. A further copy pass can then be performed for only those pages of memory which have been dirtied. This will take less time that a full copy of the memory. Accordingly, there are typically less pages marked as dirty at the end of the next copy pass and, as a result, the copy passes can become shorter and shorter. As some time it is necessary to decide to inhibit DMA writes for a short period for a final, short, copy pass, at the end of which the memories of the two processing sets will be the same and the primary processing set can issue a reset operation to restart the combined mode.

The dirty RAM 124 is set and cleared in both the combined and split modes. This means that in split mode the dirty RAM 124 may be cleared by either processing set.

The dirty RAM 124 address is decoded from bits 13 to 28 of the PCI address presented by the D bus device. Erroneous accesses which present illegal combinations of the address bits 29 to 31 are mapped into the dirty RAM 124 and a bit is dirtied on a write, even though the bridge will not pass these transactions to the processing sets.

When reading the dirty RAM 124, the bridge defines the whole area from 0x00008000 to 0x0000ffff as dirty RAM and will clear the contents of any location in this range on a read.

As an alternative to providing a single dirty RAM 124 which is cleared on being read, another alternative would be to provide two dirty RAMs which are used in a toggle mode, with one being written to while another is read.

Figure 28:
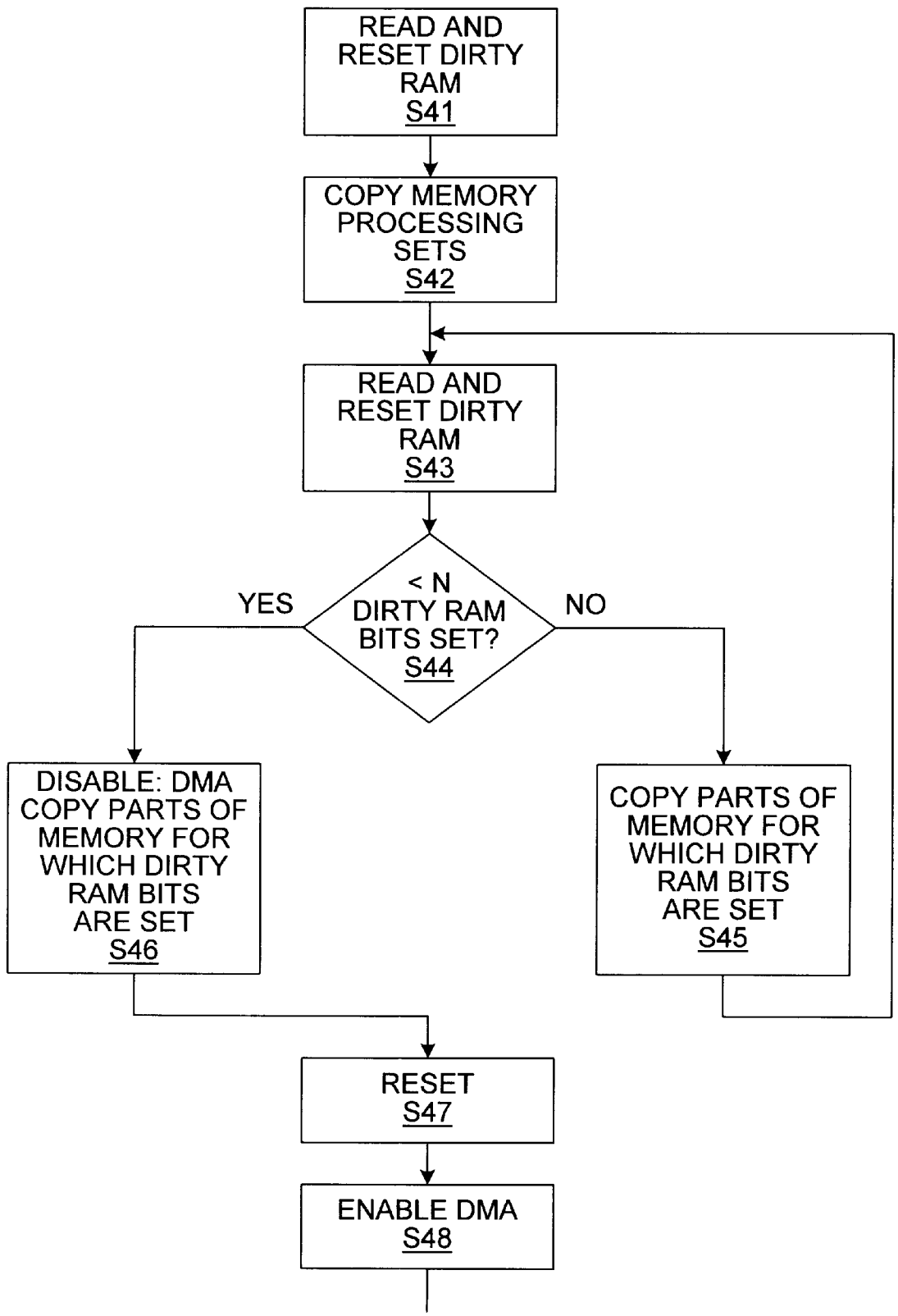
FIG. 28 is a flow diagram of a re-integration process including the monitoring of a dirty RAM.

FIG. 28 is a flow diagram summarising the operation of the dirty RAM 124.

In stage S41, the primary processing set reads the dirty RAM 124 which has the effect of resetting the dirty RAM 124.

In stage S42, the primary processor (e.g. processing set 14) copies the whole of its memory 56 to the memory 56 of the other processing set (e.g. processing set 16).

In stage S43, the primary processing set reads the dirty RAM 124 which has the effect of resetting the dirty RAM 124.

In stage S44, the primary processor determines whether less than a predetermined number of bits have been written in the dirty RAM 124.

If more than the predetermined number of bits have been set, then the processor in stage S45 copies those pages of its memory 56 which have been dirtied, as indicated by the dirty bits read from the dirty RAM 124 in stage S43, to the memory 56 of the other processing set. Control then passes back to stage S43.

If, in stage S44, it is determined less than the predetermined number of bits have been written in the dirty RAM 124, then in Stage S45 the primary processor causes the bridge to inhibit DMA requests from the devices connected to the D bus 22. This could, for example, be achieved by clearing the arbitration enable bit for each of the device slots, thereby denying access of the DMA devices to the D bus 22. Alternatively, the address decoder 142 could be configured to ignore DMA requests under instructions from the primary processor. During the period in which DMA accesses are prevented, the primary processor then makes a final copy pass from its memory to the memory 56 of the other processor for those memory pages corresponding to the bits set in the dirty RAM 124.

In stage S47 the primary processor can issue a reset operation for initiating a combined mode.

In stage S48, DMA accesses are once more permitted.

It will be appreciated that although particular embodiments of the invention have been described, many modifications/additions and/or substitutions may be made within the spirit and scope of the present invention as defined in the appended claims. For example, although in the specific description two processing sets are provided, it will be appreciated that the specifically described features may be modified to provide for three or more processing sets.

What is claimed is:

1. A bridge for a multi-processor system, the bridge comprising a first I/O bus interface for connection to a first I/O bus for a first processing set, a second I/O bus interface for connection to a second I/O bus for a second processing set, a device bus interface for connection to a device bus, a bridge control mechanism configured to be operable to compare address and data phases of I/O accesses by the first and second processing sets and at least one dissimilar data register for each processing set, wherein the bridge control mechanism is configured to be operable in response to an address phase of a dissimilar data register write access to disregard any differences in data for the dissimilar data write access.

2. The bridge of claim 1, wherein the bridge control mechanism comprises a comparator configured to be operable in a combined mode to detect differences between signals on the first and second I/O buses as indicative of a lockstep error.

3. The bridge of claim 2, wherein the bridge control mechanism comprises an address detector responsive to a signal identifying a write to a dissimilar data register during an address phase of an I/O access by the first and second processing sets to inhibit the comparator during the subsequent data phase of the I/O access.

4. The bridge of claim 3, wherein the bridge control mechanism is operable to block the output of the comparator.

5. The bridge of claim 3, wherein the bridge control mechanism is operable to inhibit the operation of the comparator.

6. The bridge of claim 3, wherein the bridge control mechanism is configured to be operable to respond to a read address supplied in common by the first and second processing sets for a dissimilar data read access to supply data read from a determined one of the dissimilar data registers to the first and second processing sets.

7. The bridge of claim 6, wherein the read address supplied in common by the first and second processing sets determines the dissimilar data register from which data is read.

8. The bridge of claim 2, comprising an address decode mechanism configured to be operable to determine target addresses for write and read accesses, the address decode mechanism being configured to be operable to be responsive to a common write address from the first and second processing sets for a write to a dissimilar data register to derive first and second dissimilar data register addresses for the first and second processing sets, respectively.

9. The bridge of claim 8, wherein the address decode mechanism is responsive to a read address supplied in common by the first and second processing sets for a dissimilar data read access to access a selected one of the first and second dissimilar data registers.

10. The bridge of claim 9, wherein the common write address is different from the common read address.

11. The bridge of claim 9, wherein the common write address is one of a set of possible common read addresses.

12. The bridge of claim 1, comprising a controllable routing matrix coupled between the first processor bus interface, the second processor bus interface, the device bus interface and the dissimilar data registers, the bridge control mechanism being configured to be operable to control the routing matrix selectively to interconnect the first processor bus interface, the second processor bus interface, the device bus interface and the dissimilar data registers.

13. The bridge of claim 12, comprising initiator and target controllers for determining a path from an input to an output of the routing matrix, the initiator controller being responsive to determination of the master for an bus operation and the target controller being responsive to determination of a destination address by the address decode mechanism.

14. The bridge of claim 13, wherein the master and target controllers are further responsive to an output of the address detector to modify the path from the input to the output of the routing matrix.

15. The bridge of claim 1, wherein the dissimilar data registers are configured as separate registers in the bridge.

16. The bridge of claim 1, comprising at least one further processor bus interface for connection to an I/O bus of a further processing set.

17. The system of claim 16, further comprising at least one further processing set.

18. A bridge for a multi-processor system, the bridge comprising means for interfacing to a first I/O bus for a first processing set, a second I/O bus for a second processing set and a device bus, means for comparing address and data phases of I/O accesses by the first and second processing sets, at least one dissimilar data register for each processing set and means for responding to an address phase of a dissimilar data register write access to cause the comparing means to disregard any differences in data for the dissimilar data write access.

19. A computer system comprising a first processing set having a first I/O bus, a second processing set having a second I/O bus, a device bus and a bridge, the bridge being connected to the first I/O bus, the second I/O bus and a device bus and comprising a bridge control mechanism configured to be operable to compare address and data phases of I/O accesses by the first and second processing sets and at least one dissimilar data register for each processing set, wherein the bridge control mechanism is configured to be operable in response to an address phase of a dissimilar data register write access to disregard differences in data for the dissimilar data write access.

20. The system of claim 19, wherein each processing set comprises at least one processor, memory and a processing set I/O bus controller.

21. A method of operating a multi-processor system comprising a first processing set having a first I/O bus, a second processing set having a second I/O bus, a device bus and a bridge, the bridge being connected to the first I/O bus, the second I/O bus and the device bus, the method comprising:

comparing address and data phases of I/O accesses by the first and second processing sets for determining lock-step operation of the processing sets;

detecting an address phase of a dissimilar data register write access; and disregarding differences in the data for the dissimilar data write access; and storing the data of the data phase for the dissimilar data write access for the first and second processing sets in first and second dissimilar data registers, respectively.

22. The method of claim 21, comprising subsequently detecting a read destination address supplied in common by the first and second processing sets for a dissimilar data read access to supply data read from a determined one of the dissimilar data registers to the first and second processing sets.

23. The method of claim 21, wherein the read destination address supplied in common by the first and second processing sets determines the dissimilar data register from which data is read.

* * * * *